US012171385B2

(12) United States Patent
Wang et al.

(10) Patent No.: US 12,171,385 B2
(45) Date of Patent: Dec. 24, 2024

(54) BASE STATION AND CLEANING EQUIPMENT

(71) Applicant: CHENGDU QUANJING INTELLIGENT TECHNOLOGY CO., LTD., Chengdu (CN)

(72) Inventors: Jixin Wang, Chengdu (CN); Yongbin Yang, Chengdu (CN); Suijun Wei, Chengdu (CN)

(73) Assignee: CHENGDU QUANJING INTELLIGENT TECHNOLOGY CO., LTD., Chengdu (CN)

( * ) Notice: Subject to any disclaimer, the term of this patent is extended or adjusted under 35 U.S.C. 154(b) by 424 days.

(21) Appl. No.: 17/686,646

(22) Filed: Mar. 4, 2022

(65) Prior Publication Data
US 2022/0287537 A1 Sep. 15, 2022

(30) Foreign Application Priority Data

Mar. 11, 2021 (CN) .......................... 202110266719.X
Dec. 30, 2021 (CN) ........................... 202111662738.0

(51) Int. Cl.
*B01D 45/16* (2006.01)
*A47L 11/40* (2006.01)
(Continued)

(52) U.S. Cl.
CPC ....... *A47L 11/4091* (2013.01); *A47L 11/4025* (2013.01); *B01D 29/01* (2013.01);
(Continued)

(58) Field of Classification Search
CPC ............. A47L 11/4091; A47L 11/4025; A47L 2201/024; A47L 9/1625; A47L 9/1641;
(Continued)

(56) References Cited

U.S. PATENT DOCUMENTS 3,842,461 A * 10/1974 Wurster .................... E03F 7/10
  55/467
3,955,236 A * 5/1976 Mekelburg .............. E04D 15/07
  55/482
(Continued)

FOREIGN PATENT DOCUMENTS

CN       1454566 A     11/2003
CN       1611180 A      5/2005
(Continued)

OTHER PUBLICATIONS

International Search Report and Written Opinion issued in counterpart PCT Application No. PCT/CN2021/083633, dated Nov. 11, 2021.

(Continued)

*Primary Examiner* — Dung H Bui
(74) *Attorney, Agent, or Firm* — Westbridge IP LLC

(57) ABSTRACT

Disclosed are a base station and a cleaning equipment. The base station includes: a first box defined with a sewage inlet for solid-liquid mixed garbage to enter the first box; a second box communicated with the first box, for receiving liquid garbage from the first box; a cyclone separator communicated with the first box; and a fan communicated with the cyclone separator, the fan is configured to drive an external airflow into the first box from the sewage inlet, and drive the external airflow to enter the fan after passing through the cyclone separator, such that the solid-liquid mixed garbage enters the first box through the sewage inlet.

8 Claims, 17 Drawing Sheets

(51) Int. Cl.
  *B01D 29/01* (2006.01)
  *B01D 29/11* (2006.01)
  *B01D 29/52* (2006.01)
  *B01D 29/56* (2006.01)
  *B01D 46/24* (2006.01)
  *B01D 50/20* (2022.01)
  *B04C 3/06* (2006.01)
  *B04C 9/00* (2006.01)

(52) U.S. Cl.
  CPC ............ *B01D 29/117* (2013.01); *B01D 29/52* (2013.01); *B01D 29/56* (2013.01); *B01D 45/16* (2013.01); *B01D 46/2403* (2013.01); *B01D 50/20* (2022.01); *B04C 3/06* (2013.01); *B04C 9/00* (2013.01); *A47L 2201/024* (2013.01); *B04C 2009/002* (2013.01); *B04C 2009/004* (2013.01); *B04C 2009/005* (2013.01); *B04C 2009/008* (2013.01)

(58) Field of Classification Search
  CPC ... A47L 9/1666; A47L 11/4027; B01D 29/01; B01D 29/117; B01D 29/52; B01D 29/56; B01D 45/16; B01D 46/2403; B01D 50/20; B01D 35/30; B01D 29/00; B04C 3/06; B04C 9/00; B04C 2009/002; B04C 2009/004; B04C 2009/005; B04C 2009/008
  See application file for complete search history.

(56) References Cited

U.S. PATENT DOCUMENTS

| | | | | | |
|---|---|---|---|---|---|
| 4,111,670 | A | * | 9/1978 | DeMarco | B60P 3/00 55/315 |
| 4,162,149 | A | * | 7/1979 | Mekelburg | B01D 45/12 55/315 |
| 4,218,226 | A | * | 8/1980 | Boozer | B01D 45/02 96/414 |
| 4,735,639 | A | * | 4/1988 | Johnstone | B01D 46/06 55/315 |
| 5,002,595 | A | * | 3/1991 | Kehr | E01H 1/0827 55/467 |
| 5,062,868 | A | * | 11/1991 | Kennedy | B65G 53/64 95/271 |
| 5,158,583 | A | * | 10/1992 | Bodin | G21F 9/005 299/1.4 |
| 5,231,805 | A | * | 8/1993 | Sander | B24C 1/086 451/92 |
| 5,409,512 | A | * | 4/1995 | Wilkerson | B01D 46/71 15/340.1 |
| 5,840,102 | A | * | 11/1998 | McCracken | B65F 3/0209 55/342 |
| 6,833,016 | B2 | * | 12/2004 | Witter | B04C 5/13 55/346 |
| 8,881,341 | B2 | * | 11/2014 | Schmidt, Jr. | E03F 9/00 15/340.1 |
| 9,045,072 | B2 | * | 6/2015 | Hetcher | G07C 5/0841 |
| 9,770,681 | B2 | * | 9/2017 | Spurgeon | E02F 3/8825 |
| 2004/0053561 | A1 | * | 3/2004 | Pieper | B24C 5/04 451/87 |
| 2005/0076624 | A1 | * | 4/2005 | Cho | A47L 5/365 55/467 |
| 2020/0359868 | A1 | | 11/2020 | Bo | |

FOREIGN PATENT DOCUMENTS

| | | |
|---|---|---|
| CN | 101730495 A | 6/2010 |
| CN | 206365853 U | 8/2017 |
| CN | 208876393 U | 5/2019 |
| CN | 111345743 A | 6/2020 |
| CN | 210749031 U | 6/2020 |
| CN | 211299790 U | 8/2020 |
| CN | 111802972 A | 10/2020 |
| CN | 211933914 U | 11/2020 |
| CN | 112006614 A | 12/2020 |
| CN | 112401788 A | 2/2021 |
| CN | 212489759 U | 2/2021 |
| CN | 112716387 A | 4/2021 |
| CN | 112869650 A | 6/2021 |
| CN | 112869658 A | 6/2021 |
| CN | 113616120 A | 11/2021 |
| CN | 215650883 U | 1/2022 |
| EP | 2292130 A2 | 3/2011 |

OTHER PUBLICATIONS

International Search Report and Written Opinion issued in counterpart PCT Application No. PCT/CN2022/072453, dated Oct. 10, 2022.

First Office Action issued in counterpart Chinese Patent Application No. 202110266719.X, dated May 31, 2024.

* cited by examiner

BASE STATION AND CLEANING EQUIPMENT

CROSS-REFERENCE TO RELATED APPLICATIONS

This application claims priority to Chinese Patent Application No. 202110266719.X, filed on Mar. 11, 2021, and Chinese Patent Application No. 202111662738.0, filed on Dec. 30, 2021, the entire disclosure of which are incorporated herein by reference.

TECHNICAL FIELD

The present disclosure relates to the technical field of cleaning equipment, in particular to a base station and a cleaning equipment applying the base station.

BACKGROUND

In the related art, the cleaning equipment includes a cleaning device and a base station. The cleaning device can be used to collect solid garbage or liquid garbage on the ground, and the base station can be used to collect and temporarily store the garbage collected by the cleaning device. However, the garbage collected by the cleaning equipment is generally mixed with sewage and water vapor, and then enters the base station during the process of being transferred and collected by the base station. After that, the sewage and water vapor are likely to be mildewed and produce peculiar smell after staying in the follow-up air duct in the base station for a long time, or enter the fan of the base station to affect the operating life of the fan.

SUMMARY

The main objective of the present disclosure is to provide a base station, which can effectively separate the sewage and water vapor mixed in the garbage collected by the cleaning device, reduce the possibility of mildew and odor after sewage and water vapor stay in the follow-up air duct in the base station for a long time, and reduce the possibility of entering the fan of the base station to affect the operating life of the fan.

In order to achieve the above objective, the present disclosure provides a base station, including:

a first box defined with a sewage inlet for solid-liquid mixed garbage to enter the first box;

a second box communicated with the first box, for receiving liquid garbage from the first box;

a cyclone separator communicated with the first box; and a fan communicated with the cyclone separator, wherein the fan is configured to drive an external airflow into the first box from the sewage inlet, and drive the external airflow to enter the fan after passing through the cyclone separator, such that the solid-liquid mixed garbage enters the first box through the sewage inlet.

The present disclosure further provides a base station, including:

a first box defined with a sewage inlet, a sewage outlet and a suction opening;

a second box communicated with the sewage outlet;

a cyclone separator communicated with the suction opening; and a fan communicated with the cyclone separator, wherein the fan is configured to drive an airflow into the first box through the sewage inlet, drive the airflow to enter the cyclone separator through the suction opening, and enter the fan from the cyclone separator.

The present disclosure further provides a cleaning equipment, including a cleaning device and the above base station.

In technical solutions of the present disclosure, when the base station collects dust for the cleaning device, the fan is stated, the external airflow can be driven to enter the first box from the sewage inlet, and can enter the fan after passing through the cyclone separator, such that negative pressure is formed at the air inlet of the first box of the base station, and the solid-liquid mixed garbage collected in the dirt collecting box of the cleaning device can be sucked. Then, after the solid-liquid mixed garbage and sewage mixture enter the first box with the airflow, under the action of gravity, the solid garbage can stay in the box for collection, while the liquid garbage can enter the second box for collection, thereby realizing the preliminary separation of solid garbage and liquid garbage. The mixture of air and water vapor can enter the cyclone separator through the suction opening, and the airflow rotates at high speed in the cyclone separator to generate centrifugal force. Through the centrifugal force, the water vapor and some water vapor and dust mixed in the airflow can be thrown to the side wall or bottom wall of the airflow channel in the cyclone separator for collection; or the water vapor is fully vaporized, thereby realizing the separation of water vapor, airflow and dust again.

Thus, when the base station in this solution is working, the solid garbage can be collected by the first box, the liquid garbage can be collected by the second box, and the water vapor and dust can be separated and collected again by the cyclone separator. In this way, the base station can effectively separate the sewage mixed in the garbage collected by the cleaning device, such that the base station has only air in the air duct after the cyclone separator, thereby reducing the possibility of mildew and odor after sewage and water vapor stay in the follow-up air duct in the base station for a long time, and reducing the possibility of entering the fan of the base station to affect the operating life of the fan.

BRIEF DESCRIPTION OF THE DRAWINGS

In order to more clearly illustrate the embodiments of the present disclosure, drawings used in the embodiments will be briefly described below. Obviously, the drawings in the following description are only some embodiments of the present disclosure. It will be apparent to those skilled in the art that other figures can be obtained according to the structures shown in the drawings without creative work.

Figure 1:
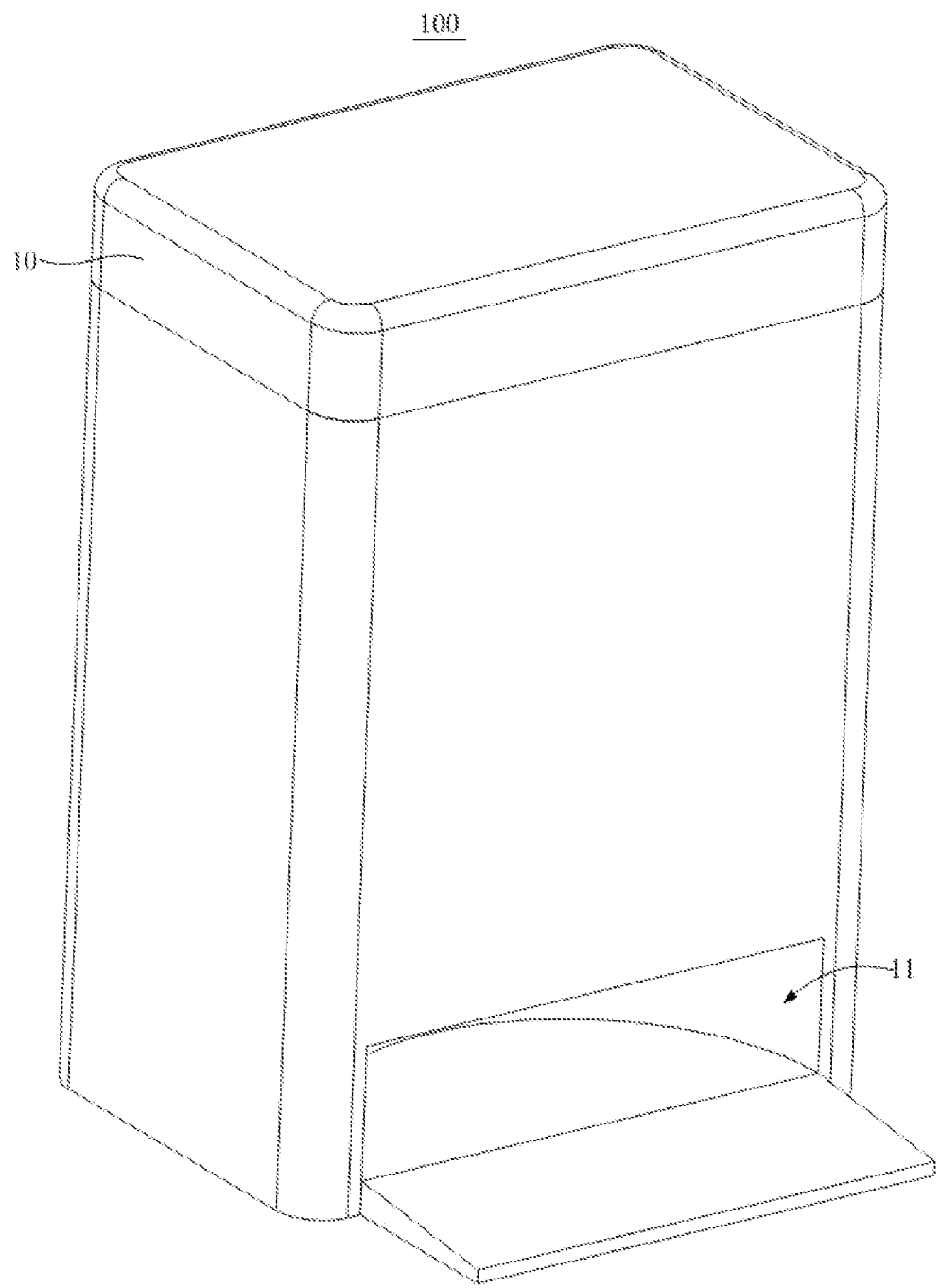
FIG. 1 is a schematic structural view of a base station according to an embodiment of the present disclosure.

The realization of the objective, functional characteristics, and advantages of the present disclosure are further described with reference to the accompanying drawings.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there is a directional indication (such as up, down, left, right, front, rear . . . ) in the embodiments of the present disclosure, the directional indication is only used to explain the relative positional relationship, movement, etc. of the components in a certain posture (as shown in the drawings). If the specific posture changes, the directional indication will change accordingly.

In the present disclosure, unless otherwise clearly specified and limited, the terms "connected", "fixed", etc. should be interpreted broadly. For example, "fixed" can be a fixed connection, a detachable connection, or a whole; can be a mechanical connection or an electrical connection; may be directly connected, or indirectly connected through an intermediate medium, and may be the internal communication between two elements or the interaction relationship between two elements, unless specifically defined otherwise. For those of ordinary skill in the art, the specific meaning of the above-mentioned terms in the present disclosure can be understood according to specific circumstances.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present disclosure.

Figure 2:
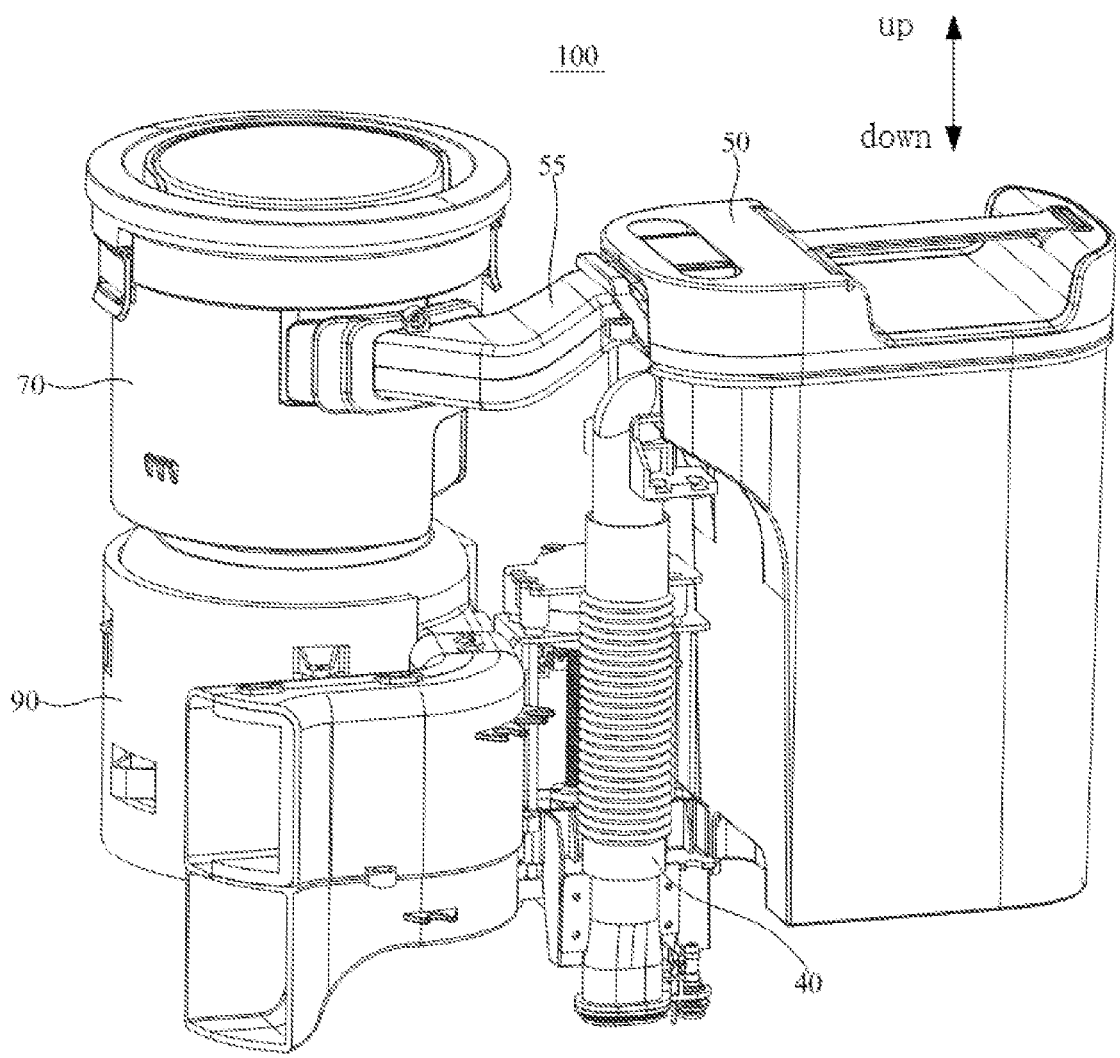
FIG. 2 is a schematic structural view of the base station of the present disclosure with the body being removed.
Figure 3:
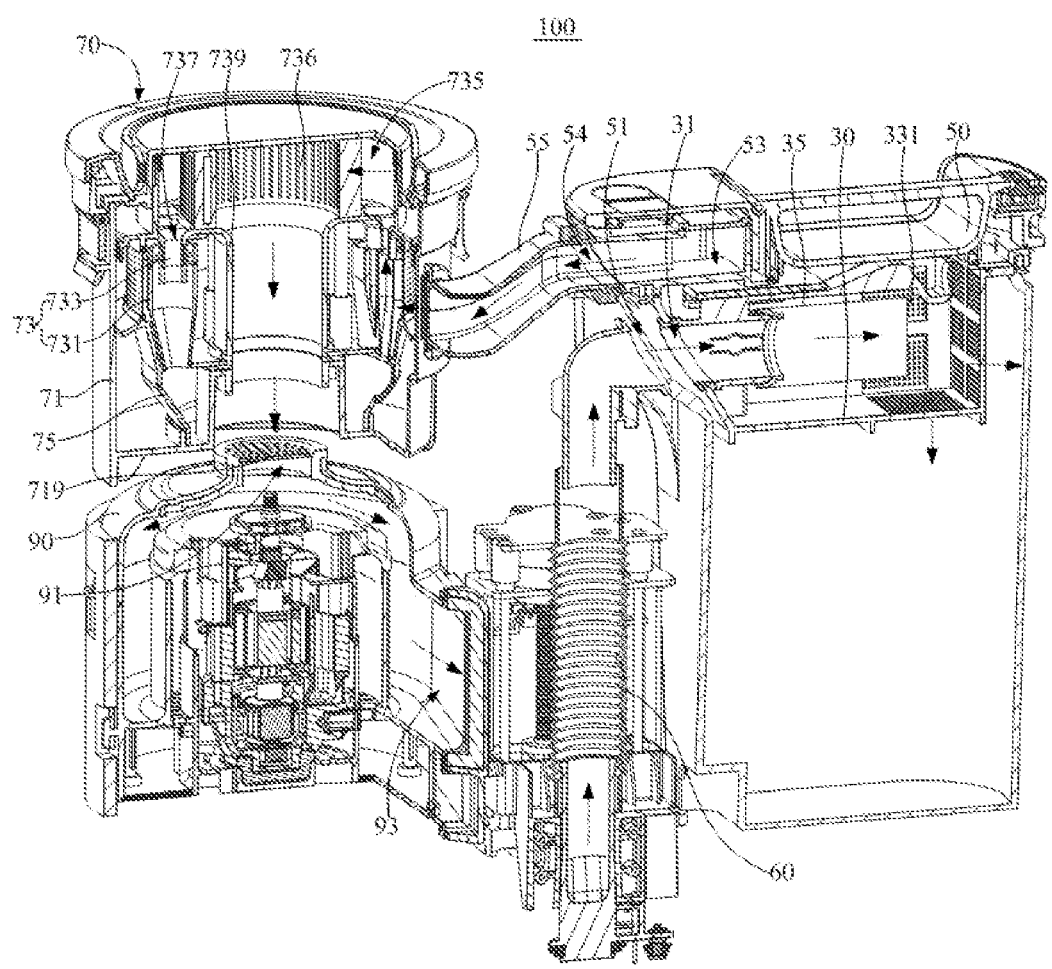
FIG. 3 is a schematic cross-sectional view of the base station of the present disclosure with the body being removed.
Figure 4:
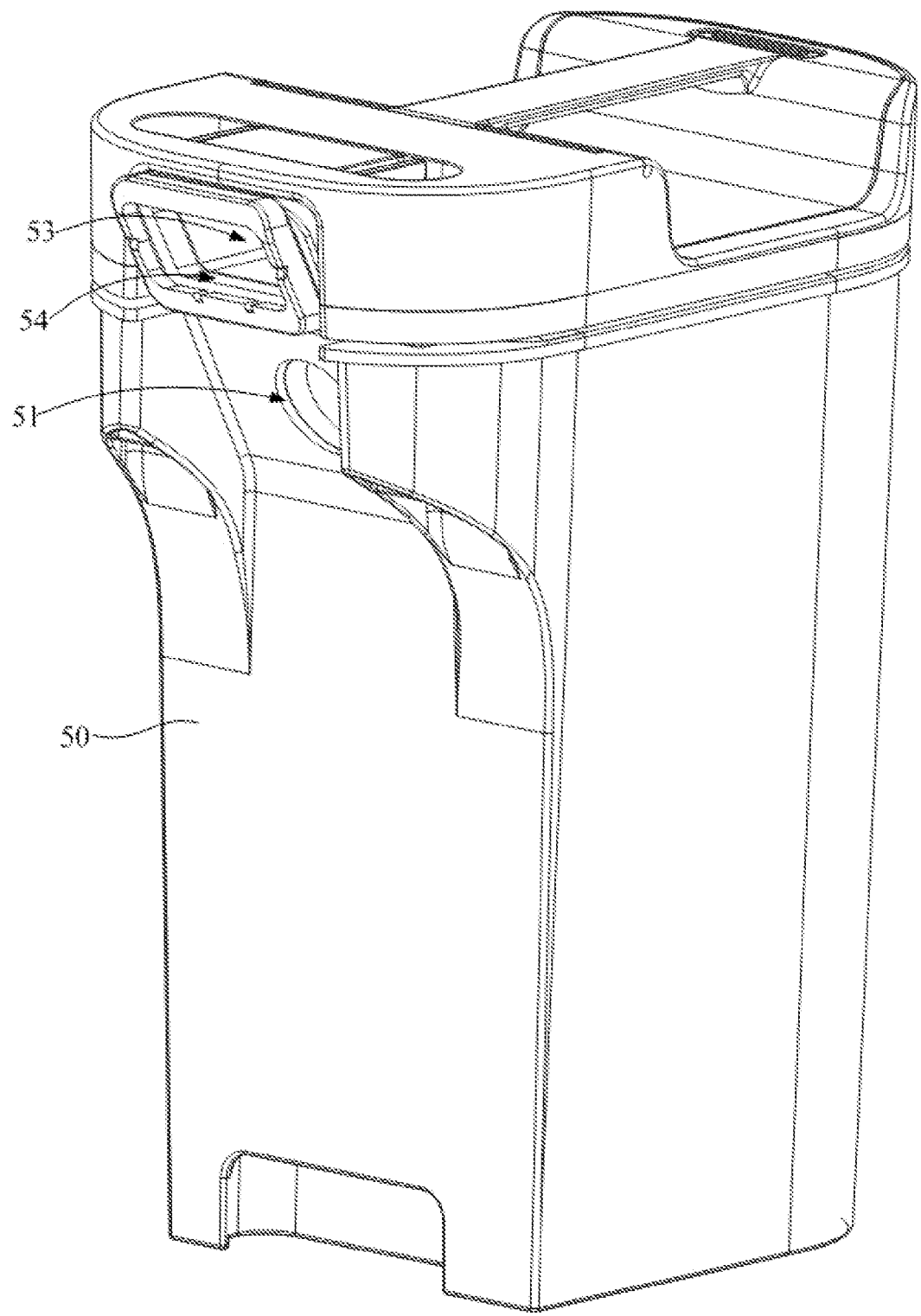
FIG. 4 is a schematic structural view of the assembly of a first box and a second box body in FIG. 2.

As shown in FIG. 1 to FIG. 3, the present disclosure provides a base station 100. In an embodiment of the present disclosure, the base station 100 includes a first box 30, a second box 50, a cyclone separator 70 and a fan 90. The first box 30 is defined with a sewage inlet 31 for solid-liquid mixed garbage to enter the first box 30. The second box 50 is communicated with the first box 30, for receiving liquid garbage from the first box 30. The cyclone separator 70 is communicated with the first box 30. The fan 90 is communicated with the cyclone separator 70, the fan 90 is configured to drive an external airflow into the first box 30 from the sewage inlet 31, and drive the external airflow to enter the fan 90 after passing through the cyclone separator 70, such that the solid-liquid mixed garbage enters the first box 30 through the sewage inlet 31.

In an embodiment of the present disclosure, the base station 100 further includes a body 10. The body 10 can be roughly in the shape of cuboid, so that the shape thereof is relatively regular, which is convenient for being processed and formed. The first box 30, the second box 50, the cyclone separator 70 and the fan 90 can all be installed in the body 10, so that the various components of the base station 100 can be assembled to form a whole. The side wall of the lower end of the body 10 can be recessed to form a docking cavity 11 for the entry of the cleaning device (which can also be called a sweeping robot or a washing machine, or the like). After that, the base station 100 can collect dust for the cleaning device parked in the docking cavity 11, that is, the sewage inlet 31 of the base station 100 is communicated with the dust collecting box in the cleaning device, and the fan 90 of the base station 100 is activated to perform suction. The first box 30 can be used for accommodating solid-liquid mixed garbage (i.e., a mixture of solid garbage and liquid garbage) entered through the sewage inlet 31, so as to realize the preliminary transfer of the garbage in the dust collecting box of the cleaning device. The first box 30 may be roughly in the shape of cuboid, so that the shape thereof is relatively regular, which is convenient for being processed and formed. The present disclosure is not limited to this, and in other embodiments, the first box 30 may also be circular or other shapes. The second box 50 can be used for receiving the liquid garbage from the first box 30, so that the solid-liquid mixed garbage in the first box 30 only retains solid garbage, thus, the solid garbage is collected in the first box 30 and the liquid garbage is collected in the second box 50 to complete the preliminary separation of the solid garbage and the liquid garbage. The second box 50 can also be roughly in the shape of cuboid, so that the shape thereof is relatively regular, which is convenient for being processed and formed. The present disclosure is not limited to this, and in other embodiments, the second box 50 may also be circular or other shapes. The cyclone separator 70 can be used to communicate with the first box 30, so that the airflow after passing through the first box 30 can pass through the cyclone separator 70 in the subsequent process. The cyclone separator 70 can make the incoming airflow rotate at a high speed to generate centrifugal force. The water vapor or dust mixed in the airflow can be thrown to the side wall or bottom wall of the airflow channel 53 of the cyclone separator 70 by the centrifugal force, so as to realize the separation of the water vapor and dust mixed in the airflow. The cyclone separation principle of the cyclone separator 70 is recorded in the prior art, so the specific structure of the cyclone separator 70 will not be described in detail herein. The fan 90 can be used to provide airflow power, and the external airflow can be driven to pass through the first box 30, the cyclone separator 70 of and the fan 90 in sequence, and finally be discharged to the outside by the fan 90, such that negative pressure is generated at the sewage inlet 31 to realize the suction of the solid-liquid mixed garbage in the dust collecting box of the cleaning device.

In technical solutions of the present disclosure, when the base station 100 collects dust and sewage for the cleaning device, the fan 90 is started, the external airflow can be driven to enter the first box 30 from the sewage inlet 31, and can enter the fan 90 after passing through the cyclone separator 70, such that negative pressure is formed at the air inlet of the first box 30, and the solid-liquid mixed garbage collected in the dirt collecting box of the cleaning device can be sucked. Then, after the solid-liquid mixture enters the first box 30 with the airflow, the solid garbage can stay in the first box 30 for collection, while the liquid garbage can enter the second box 50 for collection, thereby realizing the preliminary separation of solid garbage and liquid garbage. Then, the airflow can enter the cyclone separator 70, and the airflow rotates at high speed in the cyclone separator 70 to generate centrifugal force. Through the centrifugal force, the water vapor and some water vapor and dust mixed in the airflow can be thrown to the side wall or bottom wall of the airflow channel 53 in the cyclone separator 70 for collection; or the water vapor is fully vaporized, thereby realizing the separation of water vapor, airflow and dust again.

Thus, when the base station 100 in this solution is working, the solid garbage can be collected by the first box 30, the liquid garbage can be collected by the second box 50, and the water vapor and dust can be separated and collected again by the cyclone separator 70. In this way, the base station 100 can effectively separate the sewage mixed in the garbage collected by the cleaning device, such that the base station 100 has only air in the air duct after the cyclone separator 70, thereby reducing the possibility of mildew and odor after sewage and water vapor stay in the follow-up air duct in the base station 100 for a long time, and reducing the possibility of entering the fan 90 of the base station 100 to affect the operating life of the fan 90.

As shown in FIG. 2 to FIG. 7, in an embodiment of the present disclosure, the first box 30 is provided in the second box 50, the second box 50 is defined with a sewage outlet 51 at a position corresponding to the sewage inlet 31, the sewage outlet 51 is configured for the solid-liquid mixed garbage to enter the sewage inlet 31, the first box 30 is further defined with a passing opening 33 that communicates with the second box 50, and the passing opening 33 is configured for the liquid garbage and the airflow in the first box 30 to enter the second box 50. Both the cyclone separator 70 and the fan 90 are provided outside the second box 50, and the cyclone separator 70 is communicated with the second box 50.

In this embodiment, the first box 30 is provided in the second box 50, while both the cyclone separator 70 and the fan 90 are provided outside the second box 50 (that is, the cyclone separator 70 is indirectly communicated with the first box 30 through the second box 50), such that while ensuring that the installation is relatively compact, the second box 50 has a relatively large accommodating space and can ensure a relatively large accommodating capacity for liquid garbage. Besides, this arrangement also does not require waterproof protection for the fan 90, which is beneficial to improve the convenience of manufacturing the base station 100. The side wall of the first box 30 with the sewage inlet 31 can abut the side wall of the second box 50 with the sewage outlet 51, so that the communication between the sewage outlet 51 and the sewage inlet 31 can be more convenient. Meanwhile, the first box 30 may have a gap with the entire inner bottom wall of the second box 50 so as to form a space for collecting liquid garbage. The first box 30 may also have a gap with a part of the inner bottom wall of the second box 50, at this time, another part of the inner bottom wall of the second box 50 that is not in contact with the first box 30 may be recessed to form a space for collecting liquid garbage. In addition, it should be noted that the present disclosure is not limited to this, in other embodiments, the cyclone separator 70 in the present disclosure may also be directly provided in the first box 30, and the first box 30 can be separated to form a space for accommodating the cyclone separator 70. At the same time, the space can also be communicated with the second box 50, such that after passing through the first box 30 and the second box 50 in sequence, the airflow can enter the space of the first box 30 for accommodating the cyclone separator 70 again and enter the cyclone separator 70. However, in another embodiment, similar to the cyclone separator 70 and the fan 90, the first box 30 can also be provided outside the second box 50. At this time, the cyclone separator 70 can be directly communicated with the first box 30.

As shown in FIG. 2, in an embodiment of the present disclosure, the cyclone separator 70 and the fan 90 are provided on a same side of the second box 50 along a horizontal direction, and the cyclone separator 70 and the fan 90 are sequentially distributed along a vertical direction.

In this embodiment, the cyclone separator 70 and the fan 90 are provided on the same side of the second box 50 and are distributed in a stack. The cyclone separator 70 and the fan 90 can also be distributed relatively compactly, therefore, it is beneficial to further improve the compactness of the installation of the first box 30, the second box 50, the cyclone separator 70 and the fan 90, so as to reduce the overall volume of the base station 100. It should be noted that the present disclosure is not limited to this, in other embodiments, when the body 10 of the base station 100 has a relatively large accommodating space, the cyclone separator 70 and the fan 90 can also be arranged side by side in the horizontal direction.

As shown in FIG. 2 and FIG. 3, in an embodiment of the present disclosure, the base station 100 further includes a sewage suction pipe 60, the sewage suction pipe 60 is provided outside the second box 50, and one end of the sewage suction pipe 60 is communicated with the sewage outlet 51.

In this embodiment, one end of the sewage suction pipe 60 away from the sewage outlet 51 can be used to communicate with the dust collecting box of the cleaning device, so as to improve the convenience of the communication between the dust collecting box of the cleaning device and the base station 100. At the same time, the structure of the sewage suction pipe 60 is relatively simple, which can simplify the communication channel between the base station 100 and the cleaning device. The sewage outlet 51 may be disposed above the second box 50 to further increase the capacity of the second box 50 to accommodate liquid garbage. The sewage suction pipe 60 may be extended in the vertical direction. Further, in order to improve the convenience of later cleaning or maintenance and replacement, the sewage suction pipe 60 can be detachably connected to the outside of the sewage outlet 51, or a part of the sewage suction pipe 60 may be detachably inserted into the sewage outlet 51.

Figure 7:
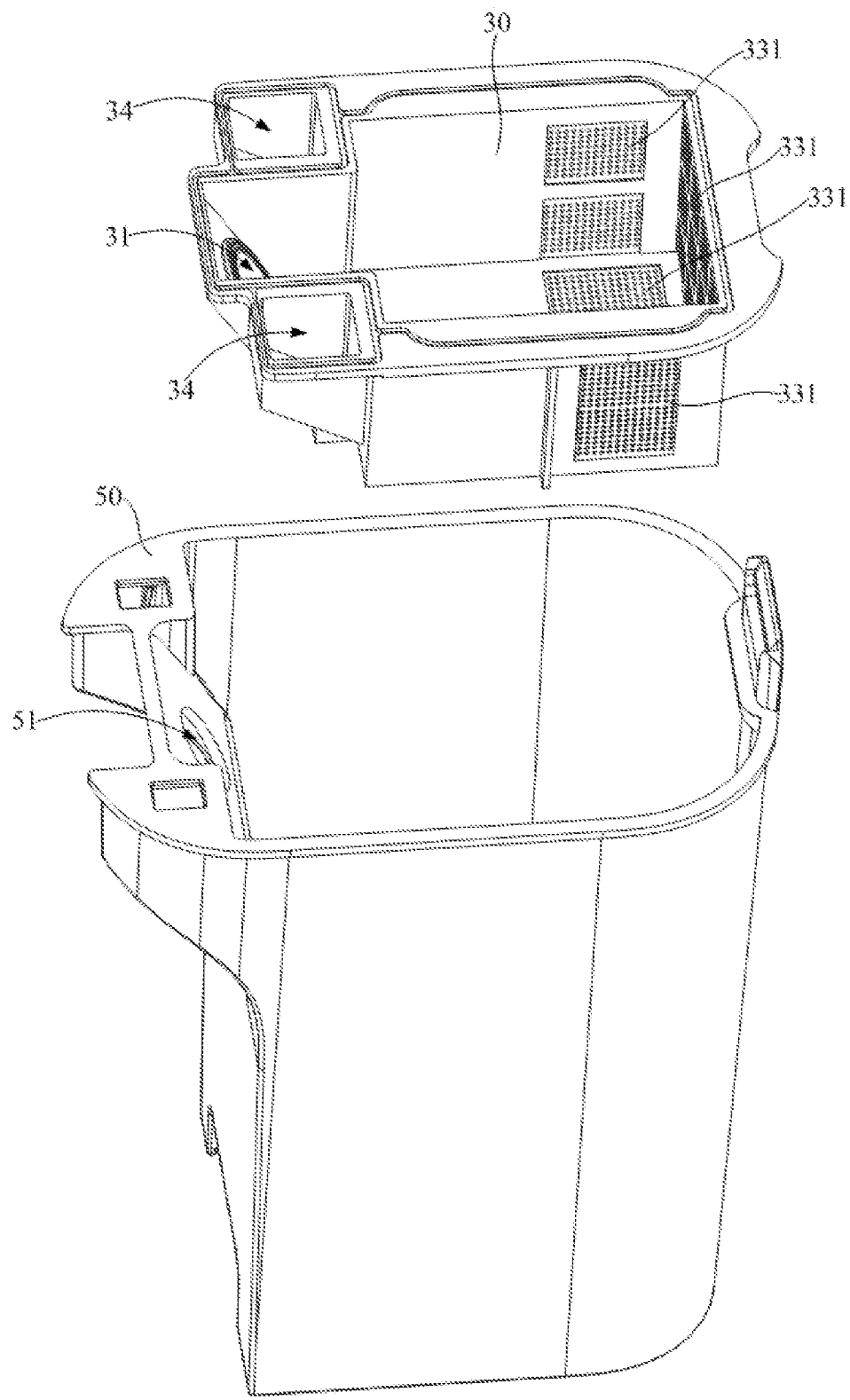
FIG. 7 is an exploded schematic structural view of the first box and the second box in FIG. 5.
Figure 8:
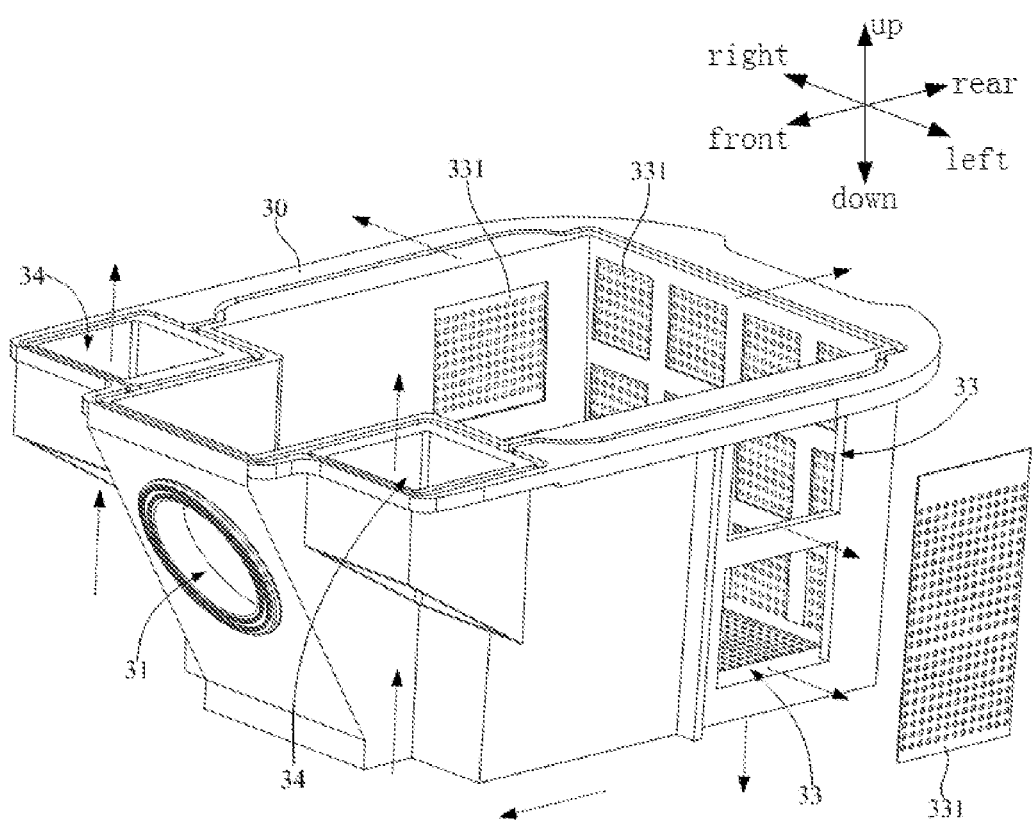
FIG. 8 is an exploded schematic structural view of the first box in FIG. 7.

As shown in FIG. 3, FIG. 7 and FIG. 8, in an embodiment of the present disclosure, the base station 100 further includes a first filter 331 provided at the passing opening 33.

In this embodiment, the first filter 331 can filter and intercept the solid-liquid mixed garbage in the first box 30, so that the solid garbage can be retained in the first box 30, and both liquid garbage and airflow can pass through the passing opening 33. Since the first filter 331 is used for filtering and intercepting, the area of the passing opening 33 can be set relatively large, which is convenient for processing. At the same time, the first filter 331 may be a filter screen or a filter element and other components that are directly purchased in the market, so as to improve the convenience of manufacturing the base station 100. It should be noted that the present disclosure is not limited to this, in other embodiments, when the area of the passing opening 33 is set relatively small, the first filter 331 is not provided at this time, and it is also possible to filter and intercept directly through the passing opening 33. In addition, the shape of the passing opening 33 may be rectangular, so as to improve the convenience of processing and forming the passing opening 33. The number of the passing openings 33 may be one, two or more.

As shown in FIG. 3, FIG. 5, FIG. 6, FIG. 7 and FIG. 8, in an embodiment of the present disclosure, a top wall of the second box 50 is provided with an airflow channel 53, and a channel outlet 54 of the airflow channel 53 is communicated with the cyclone separator 70. A front side wall of the first box 30 is defined with the sewage inlet 31, and a bottom wall, a rear side wall, a left side wall and a right side wall of the first box 30 are all defined with the passing openings 33, such that the airflow flows out from the passing openings on the bottom wall, the rear side wall, the left side wall and the right side wall of the first box 30 and then flows to a front side, and flows upward into the airflow channel 53 and enters the cyclone separator 70 from the channel outlet 54. The base station includes a plurality of first filters 331, each of the first filters 331 is provided outside the passing opening 33 on a same wall of the first box 30, and a sum of flow areas of the plurality of first filters 331 is not less than an area of the sewage inlet 31.

In this embodiment, the bottom wall, the rear side wall, the left side wall and the right side wall of the first box 30 are all defined with the passing openings 33 (the front, rear, left and right of the first box 30 are in a relative positional relationship, which means that both the bottom wall of the first box 30 and the side wall without the sewage inlet 31 are provided with a passing opening 33), such that the number of the passing openings 33 is relatively large. The liquid garbage and the airflow in the first box 30 can pass from multiple directions toward the bottom wall of the first box 30 and the side wall of the first box 30 without the sewage inlet 31, therefore it is beneficial to greatly improve the dust collection efficiency of the cleaning device by the base station 100. At the same time, the airflow channel 53 is provided on the top wall of the second box 50, so that the airflow can flow upward after flowing out from the passing opening 33 of the first box 30, while the liquid garbage can fall down after flowing out from the passing opening 33 of the first box 30, thereby facilitating the separation between the airflow and the liquid garbage and further improving the capacity of the second box 50 for the liquid garbage. Besides, the channel outlet 54 of the airflow channel 53 and the sewage outlet 51 are provided on the same side, in other words, the channel outlet 54 is provided on the front side of the second box 50, such that the airflow can flow to one side of the airflow channel 53 in a circuitous manner after flowing out from the bottom wall and the side wall of the first box 30 through the passing opening 33. The flow path of the airflow can be combined with the flow directions indicated by the dashed arrows in FIG. 3 and FIG. 8. The airflow flows forward after flowing out from the passing openings 33 on the bottom wall, rear side wall, left side wall and right side wall of the first box 30. Afterwards, the airflow flows upward and enters the airflow channel 53 through the escape port 34 provided in the first box 30 corresponding to the airflow channel 53 of the second box 50. Finally, the airflow flows out of the second box 50 through the channel outlet 54 of the airflow channel 53 and enters the subsequent cyclone separator 70. The circuitous flow of the airflow extends the flow path of the airflow, so that the airflow and the liquid garbage have a sufficient separation time, thereby further improving the separation effect between the airflow and the liquid garbage. It should be noted that the present disclosure is not limited to this herein, in other embodiments, one side wall of the second box 50 is provided with an airflow channel 53 communicating with the second box 50. Each of the first filters 331 is provided outside the passing opening 33 on the same wall of the first box 30, such that when there are two passing openings 33 or more passing openings 33 on the same wall of the first box 30, it is also only necessary to install one first filter 331 to cover two or more passing openings 33 on the wall at the same time, which is beneficial to improve the installation efficiency. The first filter 331 is provided on the outer wall surface of the first box 30, so that it is not restricted by the inner space of the first box 30 during installation, so as to further improve the convenience of installation. However, the sum of the flow areas of the plurality of first filters 331 is not less than the area of the sewage inlet 31, which is also beneficial to improve the efficiency of the airflow flowing out from the first box 30, thereby improving the dust collection efficiency of the cleaning device by the base station 100. Further, it should be noted that the present disclosure is not limited to this, in other embodiments, it is also possible for one first filter 331 to cover only one passing opening 33. In addition, the first box 30 can also be provided with the passing opening 33 only on the bottom wall, or only the side wall is provided with the passing opening 33, as long as it can be ensured that the liquid garbage and the airflow in the first box 30 can pass through and enter the second box 50.

Figure 5:
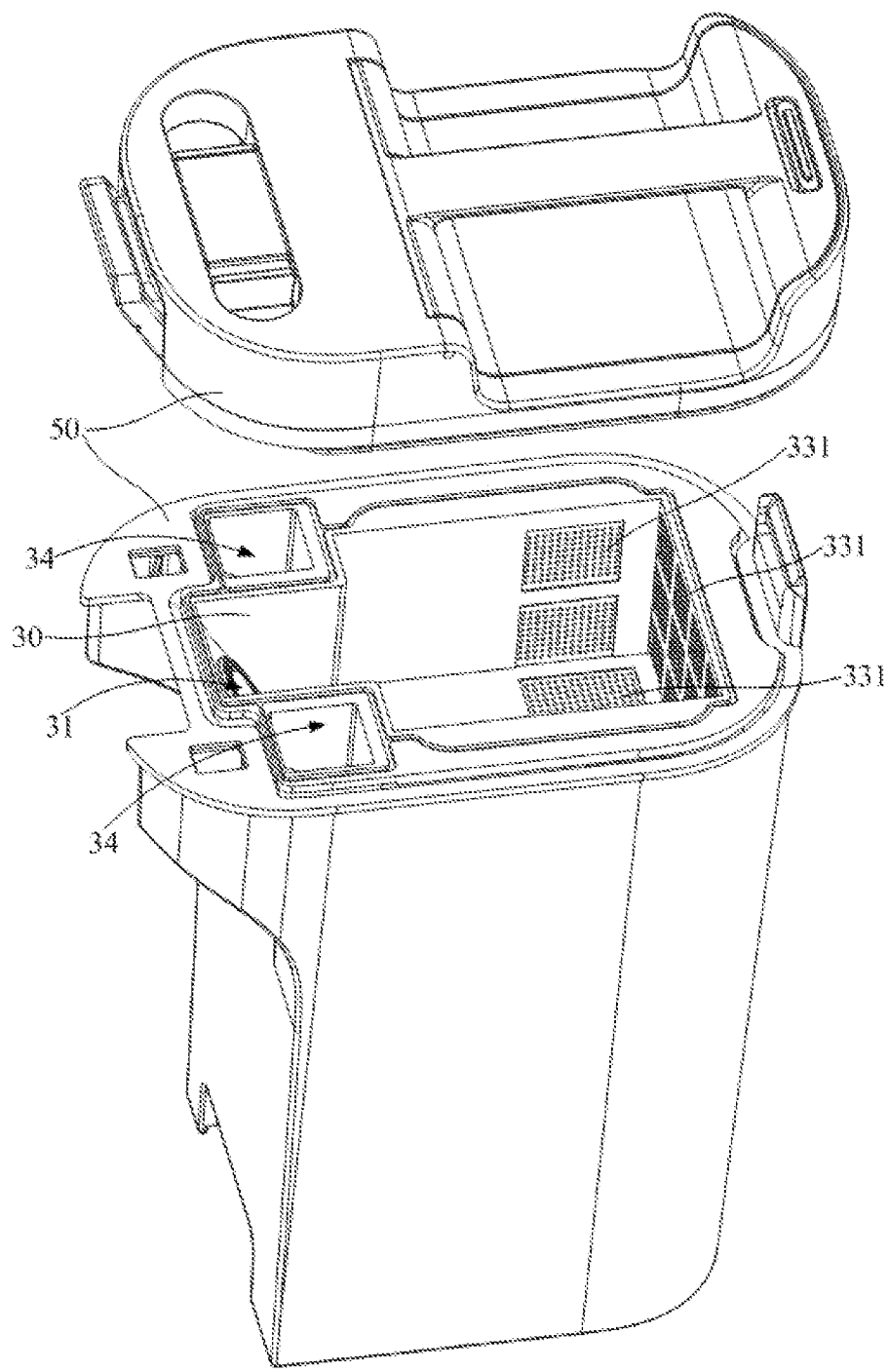
FIG. 5 is an exploded schematic structural view of the second box in FIG. 4 from a perspective.
Figure 6:
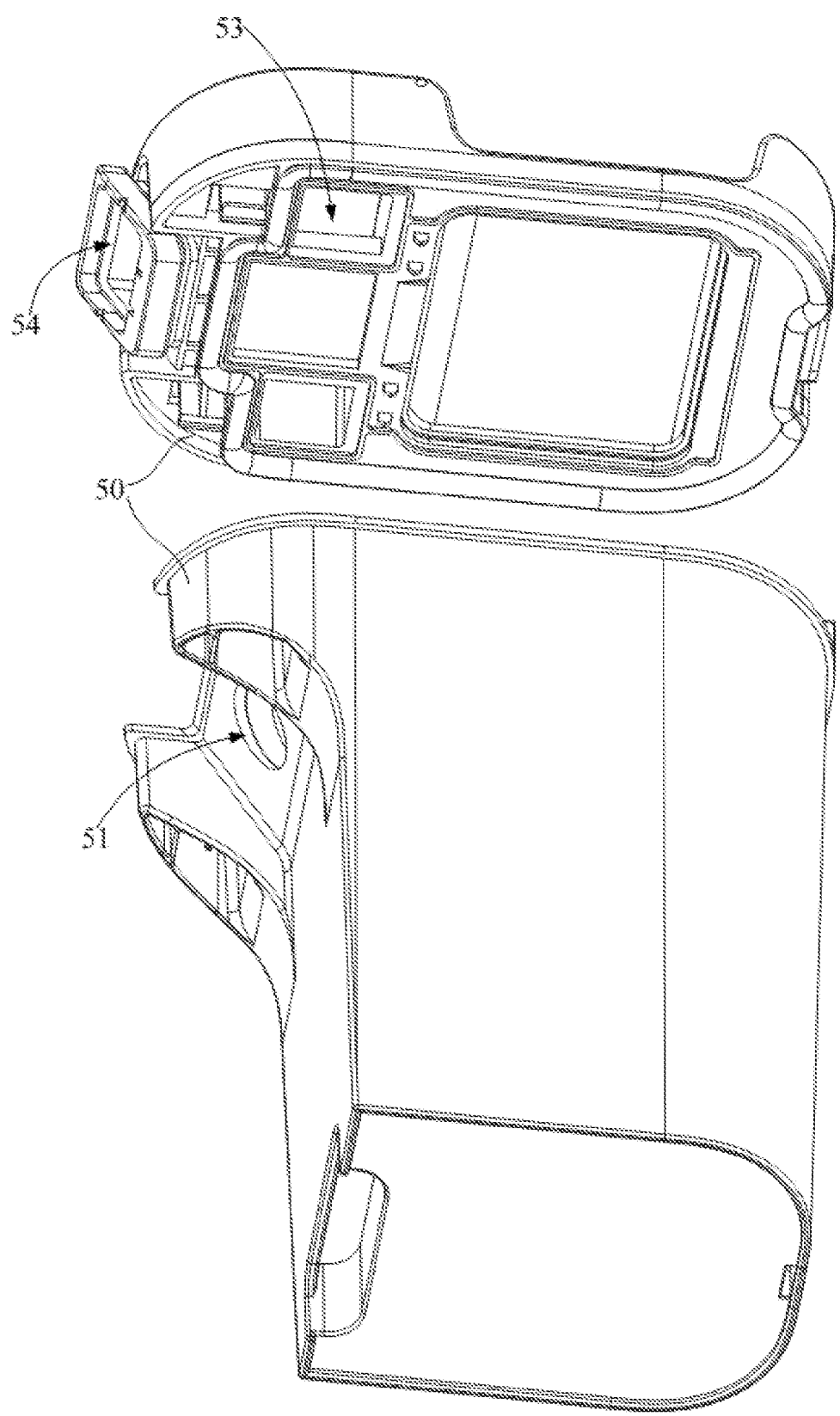
FIG. 6 is an exploded schematic structural view of the second box in FIG. 4 from another perspective.

As shown in FIG. 3, FIG. 5 and FIG. 7, in an embodiment of the present disclosure, an upper end of the first box 30 is defined with an opening covered by a top wall of the second box 50.

In this embodiment, the upper end of the first box 30 is open, such that the first box 30 only has a bottom wall and a side wall surrounding the bottom wall. At this time, the structure of the first box 30 is relatively simple, which is beneficial to improve the convenience of processing and molding of the first box 30. At the same time, such an arrangement can also facilitate the user to take out and clean up the solid garbage remaining in the first box 30. At this time, the top wall of the second box 50 can be open, so that the first box 30 is exposed when the second box 50 is opened. In addition, it should be noted that the present disclosure is not limited to this, and in other embodiments, the first box 30 can also have a top wall. In order to facilitate taking out the solid garbage in the first box 30, an opening for taking out the garbage can be defined on the top wall of the first box 30.

As shown in FIG. 2 and FIG. 3, in an embodiment of the present disclosure, the second box 50 is communicated with the cyclone separator 70 through a connecting pipe 55.

In this embodiment, the opposite ends of the connecting pipe 55 are respectively communicated with the second box 50 and the cyclone separator 70, such that the second box 50 and the airflow can be separated and communicated more conveniently. At the same time, it is also possible to install both the second box 50 and the cyclone separator 70 at their respective preset installation positions without being affected by the communication relationship between the two. When the top wall of the second box 50 is provided with the airflow channel 53, the end of the connecting pipe 55 away from the cyclone separator 70 is communicated with the channel outlet 54 of the airflow channel 53. That is, the airflow in the airflow channel 53 flows out of the second box 50 from the channel outlet 54, and then enters the connecting pipe 55, and then enters the cyclone separator 70 through the end of the connecting pipe 55 away from the channel outlet 54. However, the end of the connecting pipe 55 away from the cyclone separator 70 can be connected to the outside of the channel outlet 54, or a part of the structure at the end of the connecting pipe 55 away from the cyclone separator 70 can be directly inserted into the channel outlet 54.

As shown in FIG. 3, in an embodiment of the present disclosure, a mesh bag 35 is provided in the first box 30, one end of the mesh bag 35 is defined with an opening, and the end of the mesh bag 35 with the opening is installed at the sewage inlet 31 of the first box 30.

In this embodiment, the mesh bag 35 can also filter and intercept the solids in the solid-liquid mixed garbage entering through the sewage inlet 31, so as to further improve the filtering and intercepting effect of the solid garbage. At the same time, when the solid garbage located in the first box 30 needs to be cleaned up, the user can also directly take out the mesh bag 35, which can easily and quickly take out the collected solid garbage, thereby helping to improve the user's experience of using the base station 100.

In an embodiment of the present disclosure, the end of the mesh bag 35 with the opening is clamped and fixed to the first box 30.

In this embodiment, the mesh bag 35 is clamped and fixed to the first box 30, such that the connection relationship between the mesh bag 35 and the first box 30 is simplified, which is beneficial to improve the convenience of installing and removing the mesh bag 35 in the first box 30. At the same time, when the mesh bag 35 is removed, the mesh bag 35 will not be damaged, which is beneficial to ensure the stable collection and storage of solid garbage by the mesh bag 35. It should be noted that the present disclosure is not limited to this, and in other embodiments, the mesh bag 35 can also be fixed in the first box 30 by bonding or other means.

Figure 9:
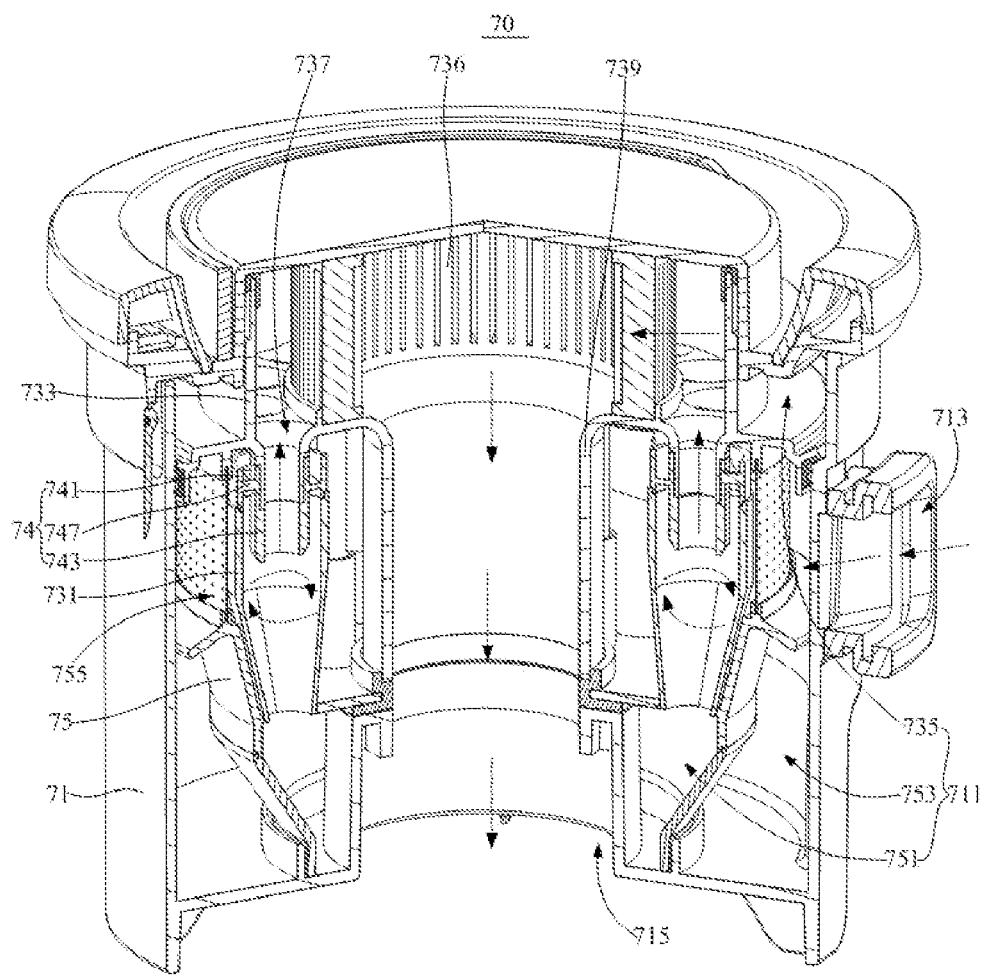
FIG. 9 is a schematic cross-sectional view of a cyclone separator in FIG. 2.
Figure 10:
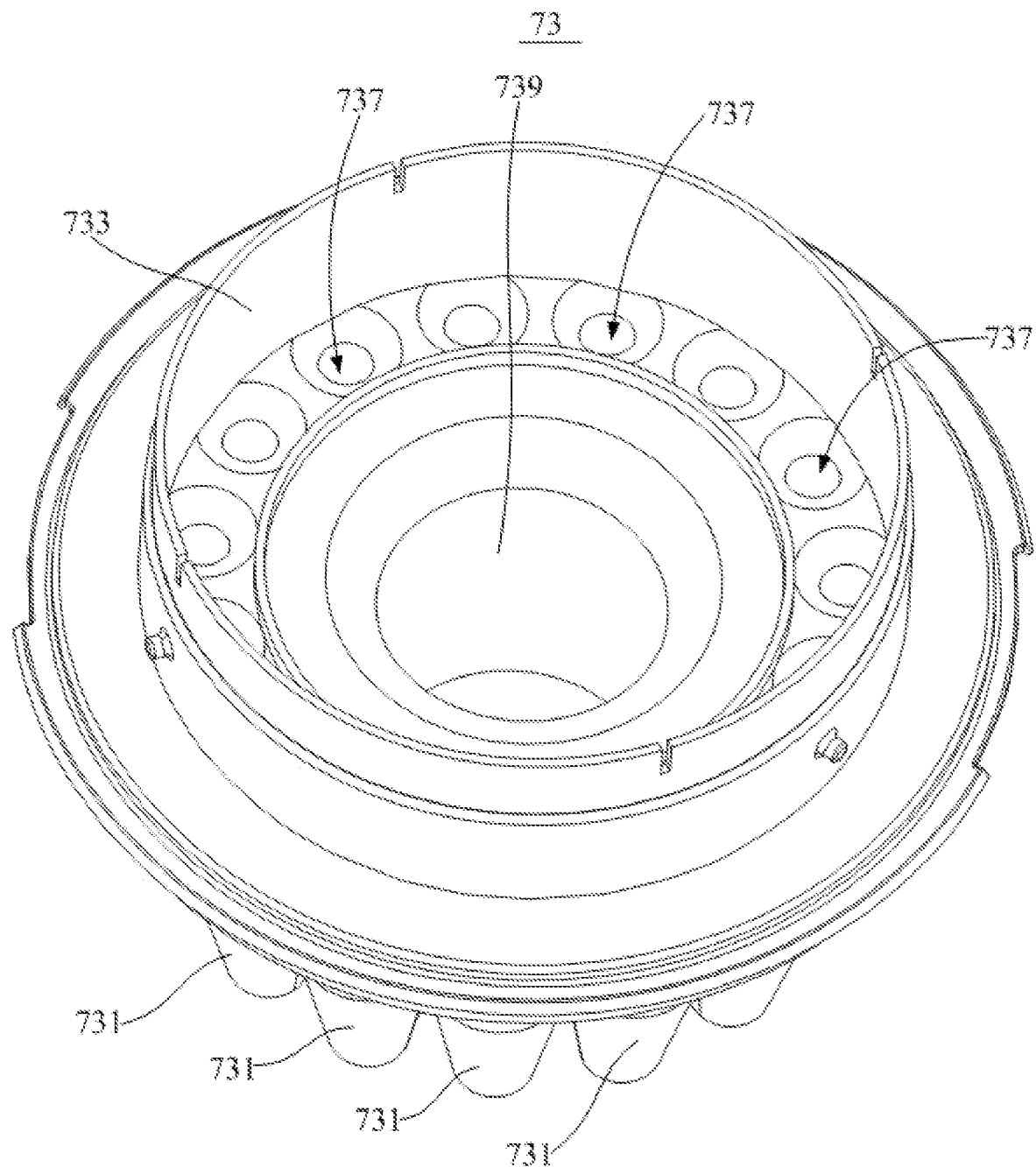
FIG. 10 is a schematic structural view of a cyclone portion in FIG. 9 from a perspective.
Figure 11:
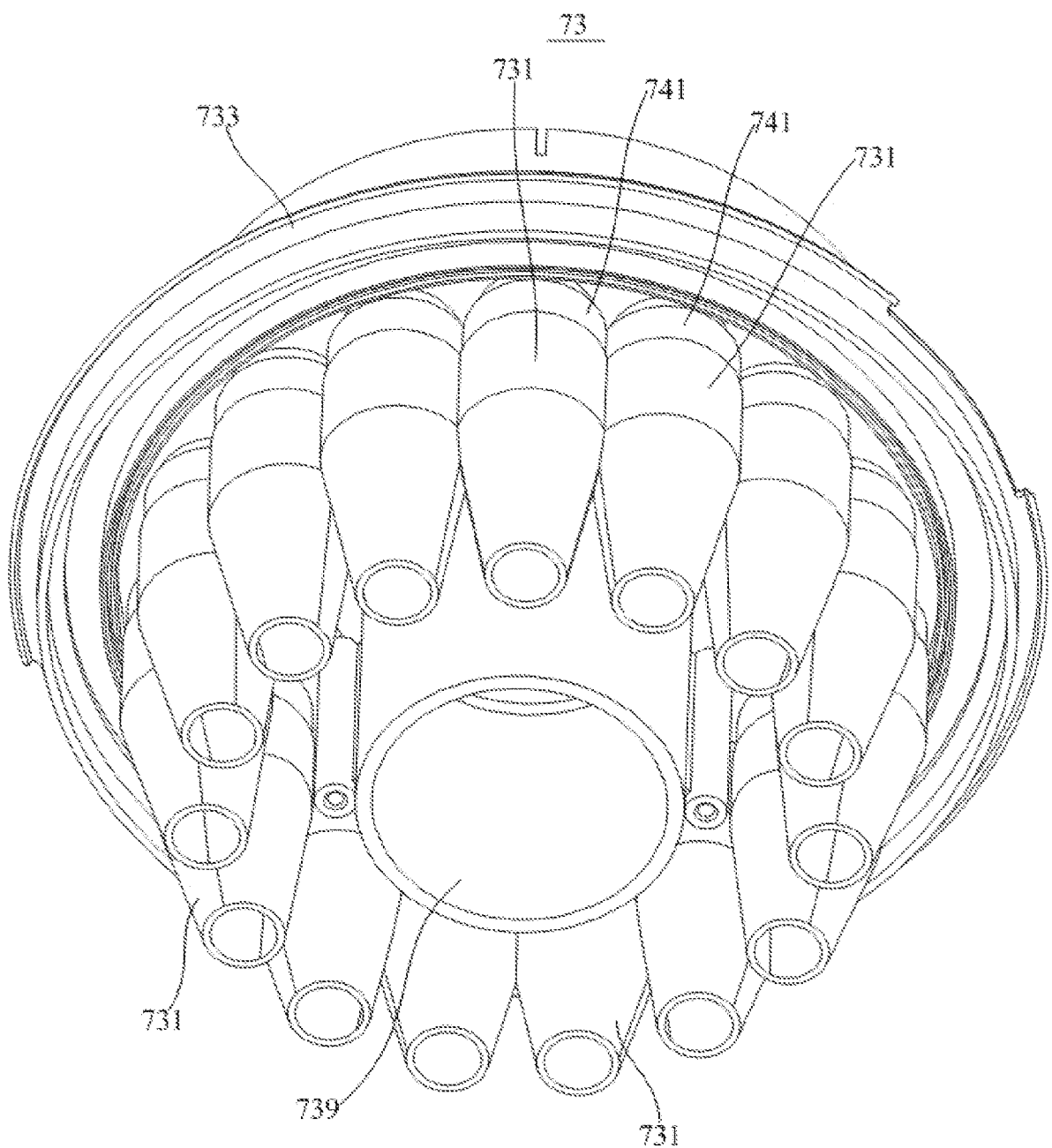
FIG. 11 is a schematic structural view of the cyclone portion in FIG. 9 from another perspective.
Figure 12:
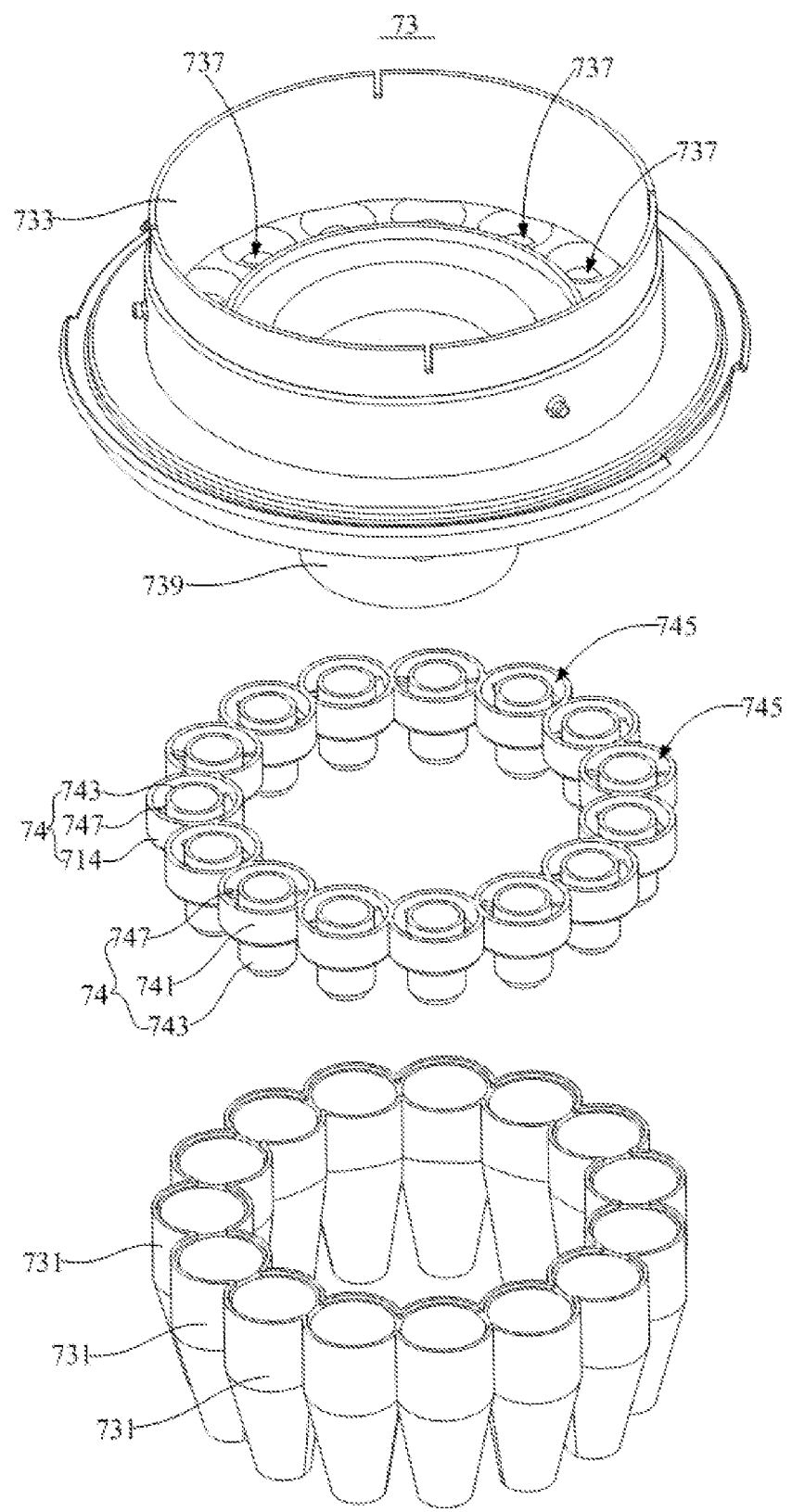
FIG. 12 is an exploded schematic structural view of the cyclone portion in FIG. 10.
Figure 13:
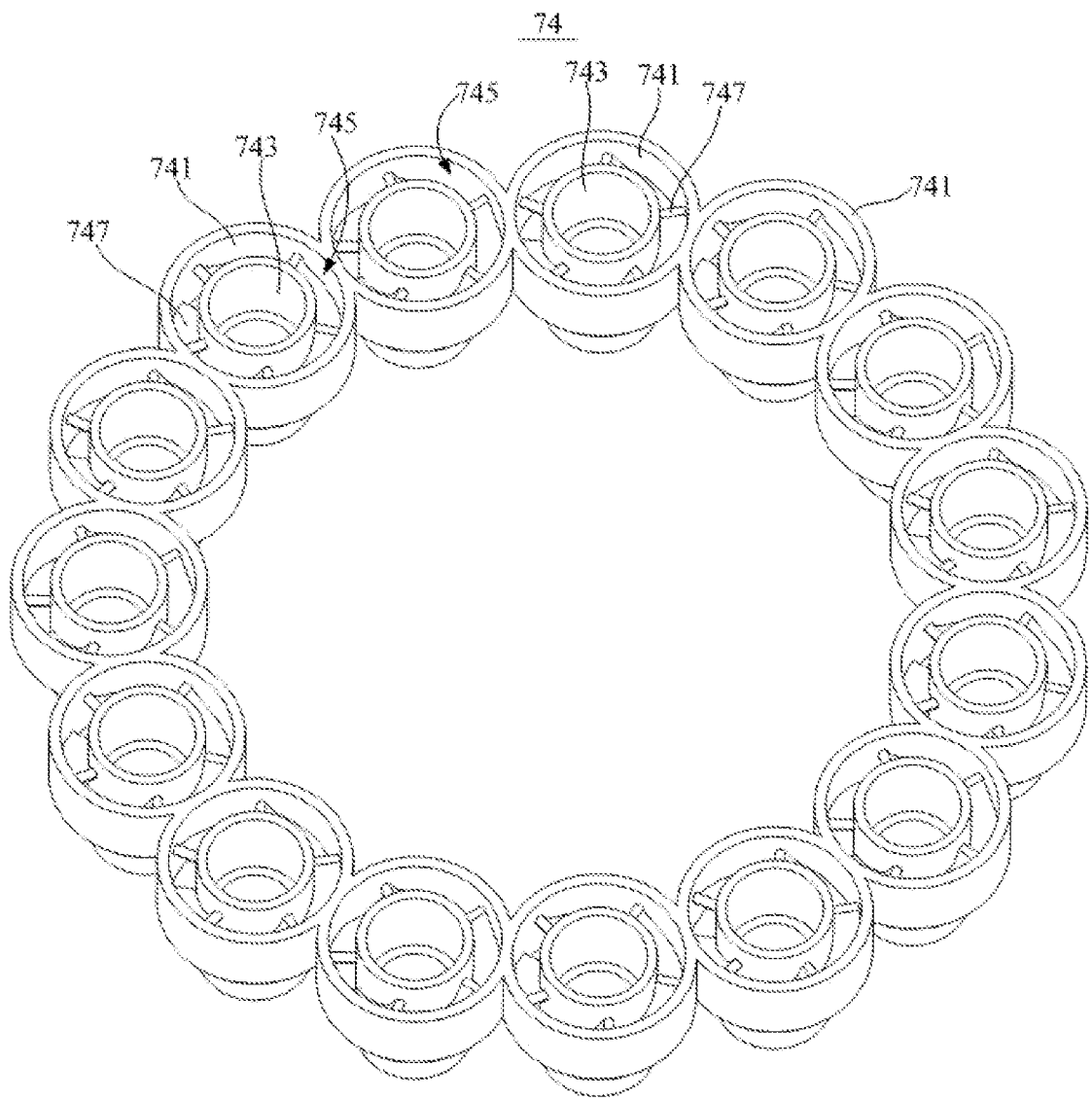
FIG. 13 is a schematic structural view of a pre-rotation structure of the cyclone portion in FIG. 12.

As shown in FIG. 3 and FIG. 9, in an embodiment of the present disclosure, the cyclone separator 70 includes an outer housing 71 and a cyclone portion 73. An accommodating cavity 711 is defined in the outer housing 71, the outer housing 71 is further defined with an air inlet 713 and an air outlet 715 communicating with the accommodating cavity 711, the air inlet 713 is communicated with the first box 30, and the air outlet 715 is communicated with the fan 90. The cyclone portion 73 is provided in the accommodating cavity 711, the cyclone portion 73 includes a plurality of cyclone cones 731 and a cyclone cover 733, the plurality of the cyclone cones 731 are around a circumference of the outer housing 71, ends with larger cross-sections of the plurality of the cyclone cones 731 are all disposed upward, and the cyclone cover 733 is located at an upper end of the plurality of the cyclone cones 731. An upper wall surface of the cyclone cover 733 and part of cavity walls of the accommodating cavity 711 are enclosed to form an air outlet cavity 735, the cyclone cover 733 is provided with a plurality of air ports 737, each of the air ports 737 is communicated with the air outlet cavity 735 and one of the cyclone cones 731, the cyclone cover 733 is also provided with an air outlet pipe 739 communicated with the air outlet cavity 735, the air outlet pipe 739 extends downward and is located between the plurality of the cyclone cones 731, and a lower end of the air outlet pipe 739 is communicated with the air outlet 715.

As shown in FIG. 9 to FIG. 13, in this embodiment, the cyclone portion 73 includes a plurality of cyclone cones 731, such that the airflow can pass through the plurality of cyclone cones 731 for cyclone separation at the same time, thereby helping to improve the separation efficiency of water vapor and dust mixed in the airflow. However, the plurality of cyclone cones 731 are arranged around, and the air outlet pipe 739 passes through the middle of the plurality of cyclone cones 731 to exhaust downwards. The air outlet 715 is also correspondingly provided on the bottom wall of the outer housing 71, so as to facilitate the communication between the cyclone separator 70 and the fan 90 distributed in sequence in the vertical direction, so as to improve the compactness of the distribution between them. It should be noted that the present disclosure is not limited to this, and in other embodiments, the cyclone portion 73 can also include only one cyclone cone 731, and the air outlet 715 at this time can be disposed on the top wall or side wall of the outer housing 71.

In an embodiment of the present disclosure, the cyclone portion 73 further includes a plurality of pre-rotation structures 74, each of the pre-rotation structures 74 is corresponding to one of the cyclone cones 731, the pre-rotation structure 74 includes an outer ring 741, an inner ring 743 and a guide vane 747, an end of the outer ring 741 with an opening is provided on an upper end of the cyclone cone 731, the inner ring 743 is provided in the outer ring 741, and is enclosed with the outer ring 741 to form an air gap 745 communicating with the cyclone cone 731, and the inner ring 743 is also communicated with the air port 737; the guide vane 747 is provided in the air gap 745 (between the outer ring 741 and the inner ring 743) and is connected to the inner ring 743 and the outer ring 741 to form an integrated structure, and the guide vane 747 is provided in a spiral extending along a circumferential direction of the pre-rotation structure 74.

In this embodiment, the inner ring 743 and the outer ring 741 are both cylindrical structures with openings at both ends, and are sleeved with each other. One end of the outer ring 741 is provided on the upper end of the cyclone cone 731 to facilitate the communication between the air gap 745 between the outer ring 741 and the inner ring 743 and the cyclone cone 731. The air gap 745 is formed by the gap between the outer ring 741 and the inner ring 743, so that the cyclone portion 73 can be sucked in from the top downward. At this time, the airflow can be drawn downward in the circumferential direction of the cyclone portion 73, which is beneficial to increase the amount of intake air and improve the separation efficiency of the airflow by the cyclone portion 73. The airflow entering the air gap 745 can be better guided by the guide vane 747 to ensure that the airflow can rotate at a high speed after the airflow in the cyclone portion 73, thereby improving the separation effect of the airflow by the cyclone portion 73. Besides, the outer ring 741 and the inner ring 743 are connected by the guide vane 747, so that the outer ring 741 and the inner ring 743 form an integral structure. In this way, the installation convenience of the pre-rotation structure 74 can be improved, and the overall strength of the pre-rotation structure 74 is also enhanced. Further, in the plurality of cyclone cones 731, each adjacent two cyclone cones 731 may also have a connection relationship, so that the plurality of cyclone cones 731 are connected to form an integral structure, while in the plurality of pre-rotation structures 74, each adjacent two outer rings 741 may also have a connection relationship, so that the plurality of pre-rotation structures are connected to form an integral structure, so as to further improve the convenience of assembling the cyclone portion 73. In addition, it should be noted that, in other embodiments, the pre-rotation structure 74 only has an inner ring 743 and a guide vane 747, and the guide vane 747 can also be provided between the inner ring 743 and the cyclone cone 731.

As shown in FIG. 9, in an embodiment of the present disclosure, a second filter 736 is provided in the air outlet cavity 735, and the second filter 736 is annular and surrounds an outer side of the air outlet pipe 739 and is located at an inner side of the plurality of air ports 737.

In this embodiment, the filter can further filter the airflow in the air outlet cavity 735, so as to further improve the separation effect of water vapor and dust mixed in the airflow. The second filter 736 can be a filter screen or a filter element.

In an embodiment of the present disclosure, the cyclone separator 70 further includes an inner housing 75, the inner housing 75 is an annular structure with openings at both ends, and the inner housing 75 surrounds an outside of the plurality of cyclone cones 731; the inner housing 75 divides a space of the accommodating cavity 711 on a side of the cyclone cover 733 facing the cyclone cone 731 to form an inner cavity 751 and an outer cavity 753 surrounding the inner cavity 751, and a side peripheral surface of the inner housing 75 is defined with filter holes 755 that communicate with the outer cavity 753 and the inner cavity 751.

In this embodiment, the airflow entering the accommodating cavity 711 from the air inlet 713 needs to pass through the filter hole 755 of the inner housing 75 before entering the cyclone portion 73. The arrangement of the plurality of filter holes 755 on the inner housing 75 has a preliminary filtering effect on the garbage with relatively large particles mixed in the airflow. The garbage with relatively large particles can be collected in the outer cavity 753, so as to realize the pre-filtration of the cyclone separator 70 before the cyclone portion 73.

As shown in FIG. 3, in an embodiment of the present disclosure, the fan 90 has a fan air inlet 91, and a third filter 719 is provided at the fan air inlet 91.

In this embodiment, the third filter 719 can further intercept and filter the airflow to enter the fan 90, so as to further prevent water vapor and dust from entering the fan 90. The third filter 719 can be a filter screen or a filter element. The fan 90 also has a fan air outlet 93. At this time, the fan air inlet 91 can be provided on the upper surface of the fan 90, and the fan air outlet 93 is provided on the side peripheral surface of the fan 90.

The present disclosure further provides a base station 100.

As shown in FIG. 14 to FIG. 17, in an embodiment of the present disclosure, the base station 100 includes a first box 30, a second box 50, a cyclone separator 70 and a fan. The first box 30 is defined with a sewage inlet 31, a sewage outlet 51 and a suction opening 10c. The second box 50 is communicated with the sewage outlet 51. The cyclone separator 70 is communicated with the suction opening 10c. The fan is communicated with the cyclone separator 70. The fan is configured to drive an airflow into the first box 30 through the sewage inlet 31, drive the airflow to enter the cyclone separator 70 through the suction opening 10c, and enter the fan from the cyclone separator 70.

In an embodiment of the present disclosure, the sewage inlet 31 of the first box 30 can communicate with the dust collecting box of the cleaning device, such that the first box 30 can be used for preliminary collection and storage of garbage and sewage entering through the sewage inlet 31 when the base station 100 collects dust from the cleaning device, so as to transfer the garbage in the dirt collection box of the cleaning device to the base station 100. The first box 30 can be roughly in the shape of cuboid, so that the shape thereof is relatively regular, which is convenient for being processed and formed. The second box 50 can be used to collect sewage entering the first box 30, that is, small solid waste and sewage in the first box 30 can enter the second box 50 through the sewage outlet 51. Similarly, the second box 50 can also be roughly in the shape of cuboid, so that the shape thereof is relatively regular, which is convenient for being processed and formed. The cyclone separator 70 may be used for the entry of airflow through the suction opening 10c. The cyclone separator 70 can make the incoming airflow rotate at a high speed to generate centrifugal force. The water vapor mixed in the airflow can be thrown to the side wall or bottom wall of the airflow channel in the cyclone separator 70 by the centrifugal force, so as to realize the separation of the water vapor mixed in the airflow. The cyclone separation principle of the cyclone separator 70 is recorded in the prior art, so the specific structure of the cyclone separator 70 will not be described in detail herein. The fan 90 can be used to provide airflow power, and the external airflow can be driven to pass through the sewage inlet 31, the first box 30, the suction opening 10c, the cyclone separator 70 and the fan in sequence, and finally be discharged to the outside by the fan 90, such that negative pressure is generated at the sewage inlet 31 to realize the suction of the garbage and the sewage in the dust collecting box of the cleaning device.

In technical solutions of the present disclosure, when the base station 100 collects dust and the sewage from the cleaning device, the fan is started to extract air, so that a negative pressure is generated at the inlet of the first box 30 of the base station 100, so that the garbage and the sewage in the dirt collecting box of the cleaning device can be sucked. After the mixture of garbage and sewage enters the first box 30 with the airflow, the larger solid garbage can stay in the first box 30 for collection under the action of gravity, while smaller solid wastes and sewage can enter into the second box 50 through the sewage outlet 51 on the first box 30 for collection. The air and water vapor mixture can enter the cyclone separator 70 through the suction opening 10c. At this time, the airflow rotates at a high speed in the cyclone separator 70 to generate centrifugal force, and through centrifugal force, the water vapor can be thrown onto the side wall or bottom wall of the airflow channel in the cyclone separator 70. Alternatively, the water particles are sufficiently vaporized, and only the air is allowed to continue to move on and enter the fan of the base station 100.

Thus, when the base station 100 in this solution is working, the larger solid garbage can be collected by the first box 30, the smaller solid garbage and sewage can be collected by the second box 50, and the water vapor can be collected by the cyclone separator 70, which realizes the effective separation of the water vapor and dust sucked by the base station 100, such that the base station 100 has only air in the air duct after the cyclone separator 70, thereby reducing the possibility of mildew and odor after water vapor stay in the follow-up air duct in the base station 100 for a long time, and reducing the possibility of entering the fan 90 of the base station 100 to affect the operating life of the fan 90.

Figure 17:
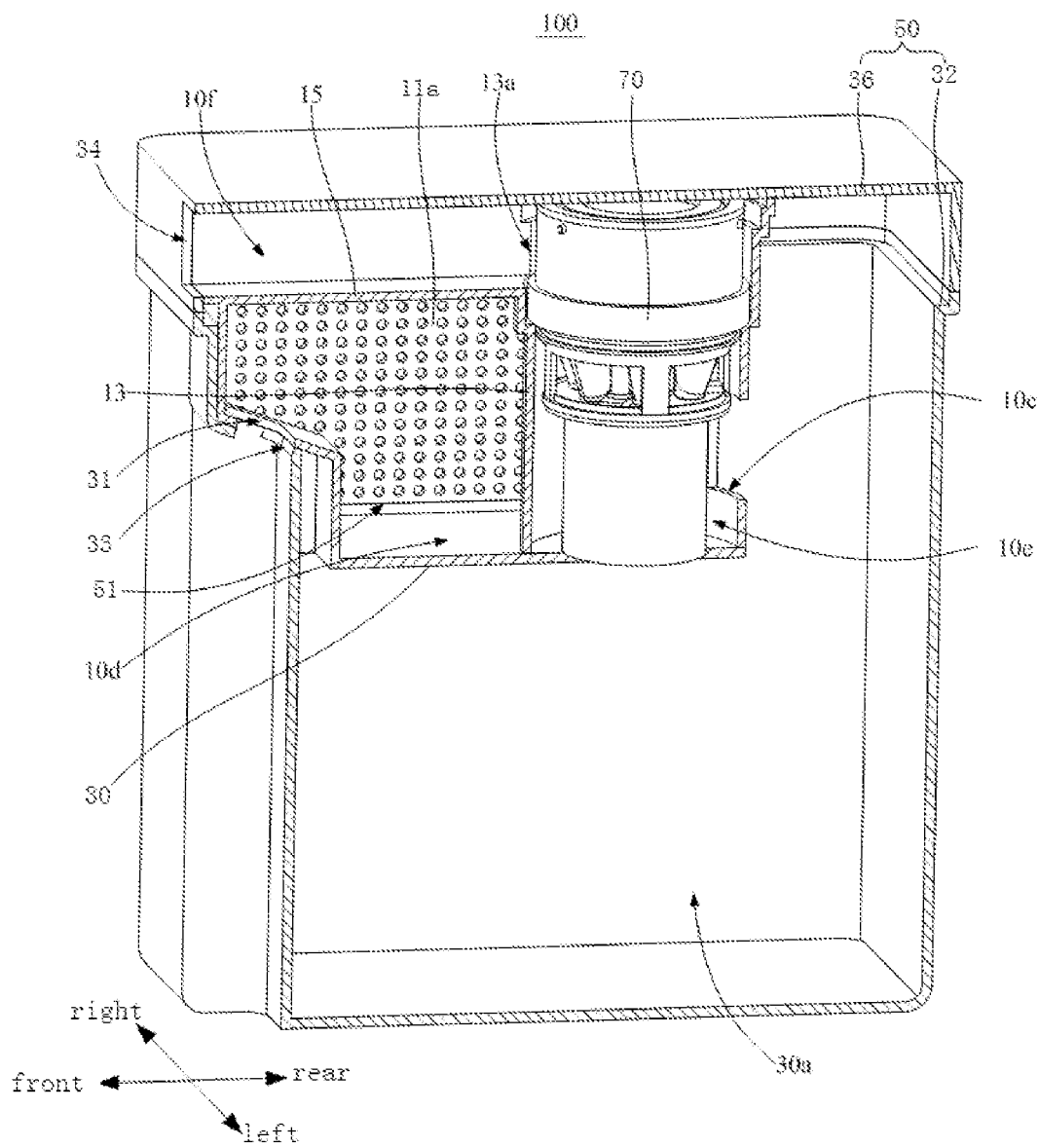
FIG. 17 is a schematic cross-sectional view of the base station in FIG. 14.

As shown in FIG. 17, in an embodiment of the present disclosure, a sewage collection cavity 30a is provided in the second box 50, and the first box 30 is provided in the sewage collection cavity 30a and a gap is defined between the first box 30 and a bottom wall of the sewage collection cavity 30a; and the sewage outlet 51 is communicated with the sewage collection cavity 30a, and a cavity wall of the sewage collection cavity 30a is provided with a passing opening 33 communicated with the sewage inlet 31 at a position corresponding to the sewage inlet 31.

It can be understood that the first box 30 is provided in the sewage collection cavity 30a of the second box 50, such that both the first box 30 and the second box 50 are more compactly distributed, thereby helping to reduce the overall volume of the base station 100 and reduce the space occupied by the base station 100. This arrangement also makes it possible to directly communicate the first box 30 with the second box 50 only through the sewage outlet 51 defined on the first box 30. However, it is necessary to provide corresponding connecting pipelines, which is beneficial to simplify the structure of the base station 100 and reduce the manufacturing cost. The gap between the first box 30 and the bottom wall of the sewage collection cavity 30a is used to form a space for accommodating sewage, and the gap between the first box 30 and the bottom wall of the sewage collection cavity 30a can be adaptively set as required. When the bottom wall of the sewage collection cavity 30a is a plane, the first box 30 can have a gap with the entire bottom wall of the sewage collection cavity 30a. When the cavity bottom wall of the sewage collection cavity 30a is a stepped surface, the first box 30 can have a gap with the cavity bottom wall of the sewage collection cavity 30a located at the bottom. The passing opening 33 can be used for the garbage and sewage in the dirt collection box to pass through, so as to enter the first box 30 through the sewage inlet 31, the shape thereof can be set to match the shape of the dust inlet, and specifically, it can be a square or a circle, etc., so that the shapes of the passing opening 33 and the sewage inlet 31 are relatively regular, which is convenient for being processed and formed. Besides, it should be noted that the present disclosure is not limited to this, in other embodiments, the first box 30 is located above the second box 50, and it is also possible to communicate the two through a connecting pipe, as long as it can be ensured that the sewage in the first box 30 can enter the second box 50 through the sewage outlet 51 for collection.

Figure 15:
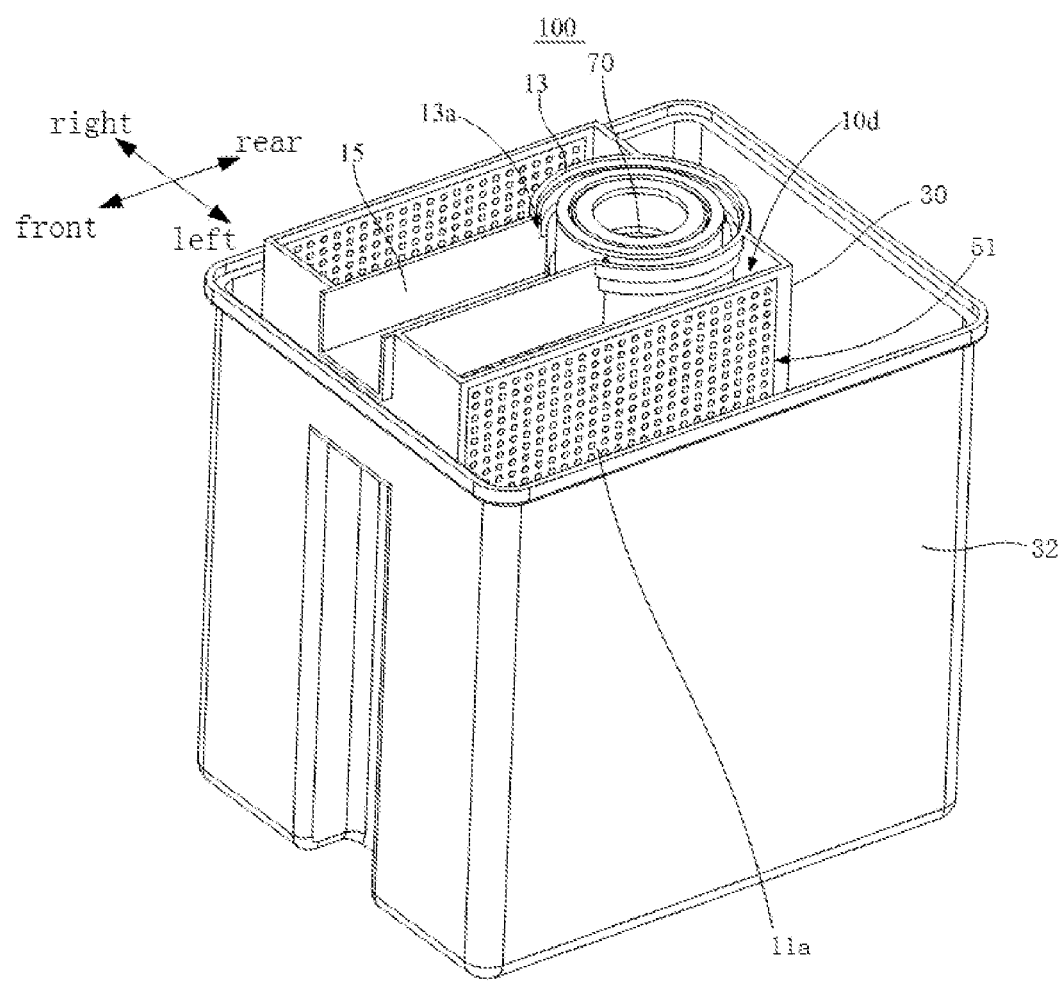
FIG. 15 is a schematic structural view of the base station in FIG. 14 from a perspective, with the upper box cover being removed.
Figure 16:
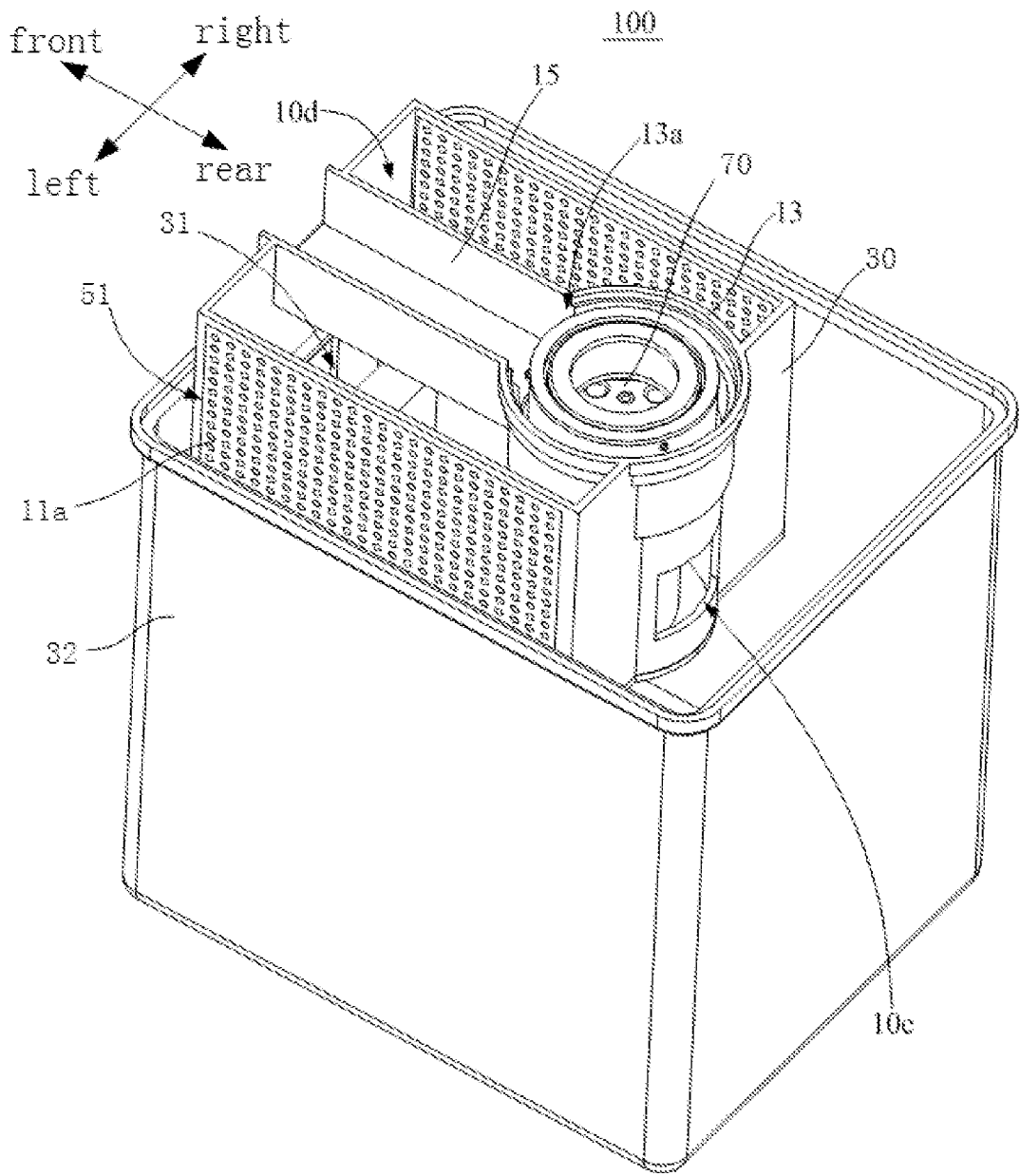
FIG. 16 is a schematic structural view of the base station in FIG. 14 from another perspective, with the upper box cover being removed.

As shown in FIG. 15, FIG. 16 and FIG. 17, in an embodiment of the present disclosure, the first box 30 is provided with a garbage collection groove 10d, and a notch of the garbage collection groove 10d is towards a top wall of the sewage collection cavity 30a, and is covered by the top wall of the sewage collection cavity 30a; and the sewage inlet 31, the sewage outlet 51 and the suction opening 10c are provided on a groove wall of the garbage collection groove 10d, and the cyclone separator 70 is provided in the garbage collection groove 10d.

It can be understood that the garbage collection groove 10d provided in the first box 30 is covered by the top wall of the sewage collection cavity 30a, such that the first box 30 is open, and at this time, it is convenient to process and shape the inner wall of the first box 30, thereby improving the convenience of processing and molding the first box 30. At the same time, the raw materials required for the processing of the first box 30 are also reduced, thereby helping to reduce the manufacturing cost of the first box 30. The cyclone separator 70 is provided in the garbage collection groove 10d, so that the cyclone separator 70 and the first box 30 can be made more compact. Therefore, it is beneficial to further reduce the overall volume of the base station 100 and reduce the space occupied by the base station 100.

As shown in FIG. 15, FIG. 16 and FIG. 17, in an embodiment of the present disclosure, the garbage collection groove 10d includes a front side wall, a rear side wall opposite to the front side wall, a left side wall, and a right side wall opposite to the left side wall; and the front side wall of the garbage collection groove 10d is defined with the sewage inlet 31, the rear side wall of the garbage collection groove 10d is defined with the suction opening 10c, and the left side wall and/or the right side wall of the garbage collection groove 10d is defined with the sewage outlet 51.

It can be understood that the front side wall of the garbage collection groove 10d is defined with the sewage inlet 31, the rear side wall of the garbage collection groove 10d is defined with the suction opening 10c, and the left side wall of the garbage collection groove 10d is defined with the sewage outlet 51, such that not only the sewage in the garbage collection groove 10d can directly enter the sewage collection cavity 30a through the sewage outlet 51, after the airflow enters the garbage collection groove 10d from the sewage inlet 31 on the front side of the first box 30, it is also possible to enter the sewage collection cavity 30a from the sewage outlet 51 on the left and/or right side of the first housing 30, and then enter the cyclone separator 70 through the suction opening 10c through the rear side of the first housing 30 (that is to say, the inside of the garbage collection groove 10d is exhausted through the combination of the suction opening 10c, the sewage collection cavity 30a and the sewage outlet 51). The flow of the airflow from the sewage outlet 51 to the suction opening 10c forms a circuitous flow path, some of the water vapor mixed in the airflow can fall to the bottom of the sewage collection cavity 30a under the action of its own gravity, thereby helping to improve the separation effect of the water vapor. Besides, both the sewage inlet 31 and the sewage outlet 51 are provided with the groove side walls of the garbage collection groove 10d, which can reduce the possibility of being blocked by the garbage in the garbage collection groove 10d, thereby helping to ensure the fluidity of the airflow in the base station 100. Both the left and right side walls of the garbage collection groove 10d can be provided with the sewage outlet 51 to increase the airflow through the sewage outlet 51 to improve the dust collection efficiency of the base station 100 in the dirt collection box of the cleaning device. It is also possible that only the left side wall of the garbage collection groove 10d is provided with the sewage outlet 51, or only the right side wall of the garbage collection groove 10d is provided with the sewage outlet 51. In addition, it should be noted that the present disclosure is not limited to this, and in other embodiments, the sewage inlet 31 and the sewage outlet 51 can be provided on the bottom wall of the garbage collection groove 10d.

As shown in FIG. 15 and FIG. 16, in an embodiment of the present disclosure, a filter screen 11a is provided in the sewage outlet 51.

It can be understood that the filter screen 11a can better block and filter the solid garbage in the garbage collection groove 10d, so as to better allow only sewage and airflow in the garbage collection groove 10d to pass through the sewage outlet 51, and reduce the possibility of smaller solid garbage entering the sewage collection cavity 30a. At this time, the sewage outlet 51 can be set relatively large, so as to facilitate the installation of the filter screen 11 a. The sewage outlet 51 can be roughly square or rectangular, so that the shape of the sewage outlet 51 is relatively regular and easy to be processed. The filter screen 11a can be installed by snap-fitting and fixing through the slot on the sewage outlet 51, or through the screw-through fixing. The filter mesh can be a wire mesh or a gauze mesh or the like. In addition, it should be noted that the present disclosure is not limited to this, in other embodiments, the sewage outlet 51 is set relatively small, and it is also possible to directly block and filter the solid waste in the garbage collection groove 10d through the sewage outlet 51.

As shown in FIG. 15, FIG. 16 and FIG. 17, in an embodiment of the present disclosure, a first partition 13 is provided in the garbage collection groove 10d, the first partition 13, a bottom wall of the garbage collection groove 10d, the rear side wall of the garbage collection groove 10d and the top wall of the sewage collection cavity 30a are enclosed to form an installation cavity 10e. The suction opening 10c is communicated with the installation cavity 10e, the cyclone separator 70 is provided in the installation cavity 10e, and an inlet of the cyclone separator 70 is communicated with the installation cavity 10e.

It can be understood that the installation cavity 10e can isolate the cyclone separator 70 and reduce the influence on the cyclone separator 70 when the garbage in the garbage collection groove 10d accumulates a certain amount, thereby helping to ensure that the cyclone separator 70 can work normally and stably. The suction opening 10c is communicated with the installation cavity 10e, and the inlet of the cyclone separator 70 is communicated with the installation cavity 10e, such that there is no need to provide a corresponding connecting pipe for connection and communication between the suction opening 10c and the cyclone separator 70, which is beneficial to further simplify the structure of the base station 100 and further reduce the manufacturing cost. The first partition 13 can be connected to the bottom wall of the garbage collection groove 10d and the rear side wall of the garbage collection groove 10d. Specifically, the first partition 13 can be integrated with the first box 30 to ensure the sealing of the installation cavity 10e. The shape of the installation cavity 10e can be set to match the shape of the cyclone separator 70, so that the cyclone separator 70 is more compactly distributed in the installation cavity 10e. It should be noted that the present disclosure is not limited to this, in other embodiments, when the first partition 13 is not provided in the garbage collection groove 10d to form the installation cavity 10e, the cyclone separator 70 can have a certain gap between the garbage groove and the bottom wall of the garbage collection groove 10d, or it is also possible to directly cover the outer side of the cyclone separator 70 with a protective shell. The inlet of the cyclone separator 70 can also be communicated with the suction opening 10c through a connecting pipe.

As shown in FIG. 15, FIG. 16 and FIG. 17, in an embodiment of the present disclosure, the first partition 13 is defined with an air outlet 13a, and the air outlet 13a is communicated with an outlet of the cyclone separator 70. The garbage collection groove is further provided with a second partition 15, the second partition 15 and the top wall of the sewage collection cavity 30a are enclosed to form an air passage 10f, one end of the air passage 10f is communicated with the air outlet 13a, and another end of the air passage 10f passes through the front side wall of the garbage collection groove 10d. The cavity wall of the sewage collection cavity 30a is provided with an escape port 34 corresponding to one end of the air passage 10f away from the air outlet 13a, and the fan is located outside the second box 50 and communicated with the escape port 34.

It can be understood that the second partition 15 and the top wall of the sewage collection cavity 30a are enclosed to form the air passage 10f, such that the fan can be provided outside the second box 50, in this case, the requirement on the installation position of the fan is reduced, thereby improving the convenience of installing the fan. It is also possible to reduce the influence of the fan on the sewage in the sewage collection cavity 30a, thereby helping to ensure the normal and stable operation of the fan. The air passage 10f is enclosed by the second partition 15 and the top wall of the sewage collection cavity 30a, such that after the first box and the second box are separately manufactured, the air passage is formed when the two are assembled to form a whole. At this time, it is not necessary to directly process the air passage to reduce the complexity of forming the air passage. The second partition 15 can be substantially U-shaped, so that the cross-section of the air passage is substantially square, that is, it has a relatively regular shape to facilitate processing and forming. Meanwhile, opposite ends of the second partition 15 can be connected to the first partition 13 and the front side wall of the garbage collection groove 10d respectively, so as to improve the connection stability of the second partition 15. Further, the second partition 15, the first partition 13 and the first box 30 can have an integrated structure.

Figure 14:
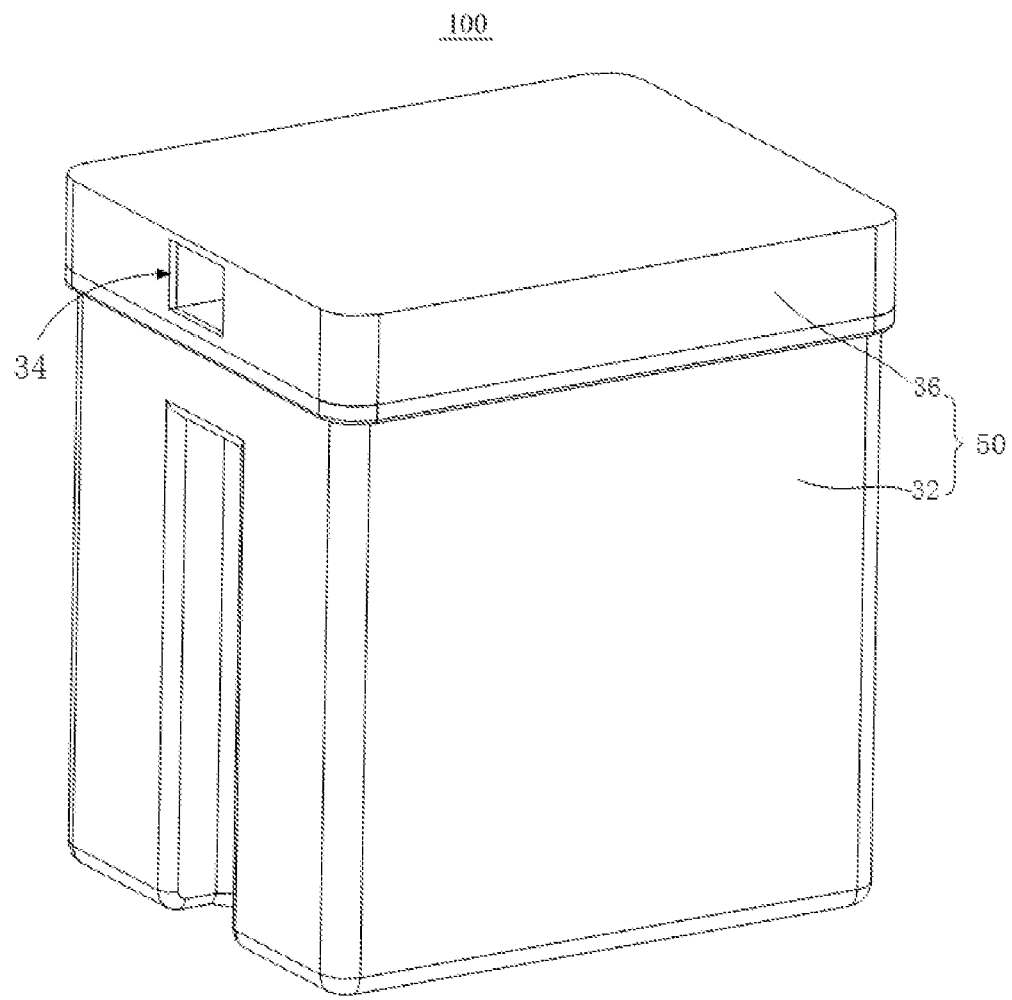
FIG. 14 is a schematic structural view of the base station according to another embodiment of the present disclosure.

As shown in FIG. 14 and FIG. 17, in an embodiment of the present disclosure, the second box 50 includes a lower box body 32 and an upper box cover 36, the upper box cover 36 is covered with the lower box body 32, and is enclosed with the lower box body 32 to form the sewage collection cavity 30a.

It can be understood that the second box 50 is composed of the lower box body 32 and the upper box cover 36, so that the lower box body 32 and the upper box cover 36 can be manufactured separately and independently. At this time, the complexity of the molding process of the sewage collection cavity 30a is simplified, which is beneficial to improve the convenience of the process and molding of the second box 50. The lower box body 32 can be provided with a groove, and the upper box cover 36 can also be provided with a groove, and the grooves on the lower box body 32 and the upper box cover 36 can cooperate to form a sewage collection cavity 30a. Alternatively, only the lower box body 32 is provided with a groove, and the upper box cover 36 is covered with the groove of the lower box body 32 to enclose the sewage collection cavity 30a. The passing opening 33 is provided on the lower box body 32 or the upper box cover 36 according to the position of the sewage inlet 31, and the escape port 34 is provided on the upper box cover 36 or the lower box body 32 according to the position of the air passage 10f away from the air outlet 13a. The lower box body 32 and the upper box cover 36 can be fixedly connected to improve the stability of the connection between the two. In order to facilitate the replacement or cleaning of the components located in the second box 50, the upper box cover 36 may also be detachably mounted on the lower box body 32. Specifically, the upper box cover 36 and the lower box body 32 can be connected by screws, snap connections, or magnetically fixed, etc., to simplify the disassembly process between the upper box cover 36 and the lower box body 32.

As shown in FIG. 14 and FIG. 17, in an embodiment of the present disclosure, the first box 30 is clamped and fixed by the lower box body 32 and the upper box cover 36.

It can be understood that the first box 30 is clamped and fixed by the lower box body 32 and the upper box cover 36, so that there is no need to set up a complicated connection structure to fix the lower box body 32 and the upper box cover 36, thereby facilitating the installation of the first box 30. It may be that both the front side wall of the sewage collection cavity 30a and the front side wall of the garbage collection groove 10d are concave to form abutted step walls. It should be noted that the present disclosure is not limited to this, and in other embodiments, the first box 30 can also be fixed in the lower box body 32 by screw connection, snap connection or magnetic attraction.

As shown in FIG. 14 and FIG. 17, the cyclone separator 70 is clamped and fixed by the first box 30 and the upper box cover 36.

It can be understood that the cyclone separator 70 is clamped and fixed by the first box 30 and the upper box cover 36, so that no additional structure is required to install and fix the cyclone separator 70, thereby facilitating the simplification of the structure of the base station 100. This arrangement also enables the installation and fixation of the cyclone separator 70 to be completed when the upper box cover 36 is installed on the lower box body 32, which is beneficial to improve the convenience of assembling the base station 100. It should be noted that the present disclosure is not limited to this, and in other embodiments, the cyclone separator 70 can also be directly fixed on the cavity wall of the installation cavity 10e through an additional connection structure.

In an embodiment of the present disclosure, at least two conical airflow channels are provided in the cyclone separator 70.

It can be understood that the arrangement of at least two conical airflow channels enables the airflow entering into the cyclone separator 70 to simultaneously perform high-speed rotational motion in the at least two conical airflow channels, so as to simultaneously separate the water vapor in the airflow through at least two conical airflow passages, and improve the water vapor separation effect of the cyclone separator 70.

In an embodiment of the present disclosure, an outlet of the cyclone separator 70 is provided with a filter element.

It can be understood that the filter element can further filter the air flowing out of the cyclone separator 70 to further block the filtered water mist and dust, therefore, it is more advantageous to ensure that the air flow out of the cyclone separator 70 is only air, thereby ensuring the separation effect of the water vapor in the subsequent air passage of the cleaning device after the cyclone separator 70.

The present disclosure further provides a cleaning equipment. The cleaning equipment includes a cleaning device and a base station 100. The specific structure of the base station 100 refers to the above-mentioned embodiments. Since the cleaning device adopts all the technical solutions of all the above-mentioned embodiments, there are at least all the beneficial effects brought about by the technical solutions of the above embodiments, which are not repeated here. The cleaning device can also be called a sweeping robot or a washing machine.

The above are only some embodiments of the present disclosure, and do not limit the scope of the present disclosure thereto. Under the inventive concept of the present disclosure, equivalent structural transformations made according to the description and drawings of the present disclosure, or direct/indirect application in other related technical fields are included in the scope of the present disclosure.

What is claimed is:

1. A base station, comprising:
a first box defined with a sewage inlet for solid-liquid mixed garbage to enter the first box;
a second box communicated with the first box, for receiving liquid garbage from the first box;
a cyclone separator communicated with the first box; and
a fan communicated with the cyclone separator,
wherein the fan is configured to drive an external airflow into the first box from the sewage inlet, and drive the external airflow to enter the fan after passing through the cyclone separator, such that the solid-liquid mixed garbage enters the first box through the sewage inlet
wherein the first box is provided in the second box, the second box is defined with a sewage outlet at a position corresponding to the sewage inlet, the sewage outlet is configured for the solid-liquid mixed garbage to enter the sewage inlet, the first box is further defined with a passing opening that communicates with the second box, and the passing opening is configured for the liquid garbage and the airflow in the first box to enter the second box; both the cyclone separator and the fan are provided outside the second box, and the cyclone separator is communicated with the second box; wherein the cyclone separator and the fan are provided on a same side of the second box along a horizontal direction, and the cyclone separator and the fan are sequentially distributed along a vertical direction; and the base station further comprises a sewage suction pipe, the sewage suction pipe is provided outside the second box, and one end of the sewage suction pipe is communicated with the sewage outlet; and wherein a mesh bag is provided in the first box, one end of the mesh bag is defined with an opening, and the end of the mesh bag with the opening is installed at the sewage inlet of the first box.

2. The base station of claim 1, wherein the base station further comprises a first filter provided at the passing opening.

3. The base station of claim 2, wherein a top wall of the second box is provided with an airflow channel, and a channel outlet of the airflow channel is communicated with the cyclone separator;
a front side wall of the first box is defined with the sewage inlet, a bottom wall, a rear side wall, a left side wall and a right side wall of the first box are all defined with passing openings, such that the airflow flows out from the passing openings on the bottom wall, the rear side wall, the left side wall and the right side wall of the first box and then flows to a front side, and flows upward into the airflow channel and enters the cyclone separator from the channel outlet;
the base station comprises a plurality of first filters, each of the first filters is provided outside the passing opening on a same wall of the first box, and a sum of flow areas of the plurality of first filters is not less than an area of the sewage inlet.

4. The base station of claim 1, wherein an upper end of the first box is defined with an opening covered by a top wall of the second box; and
the second box is communicated with the cyclone separator through a connecting pipe.

5. The base station of claim 1, wherein the end of the mesh bag with the opening is clamped and fixed to the first box.

6. The base station of claim 1, wherein the cyclone separator comprises an outer housing and a cyclone portion;

an accommodating cavity is defined in the outer housing, the outer housing is further defined with an air inlet and an air outlet communicating with the accommodating cavity, the air inlet is communicated with the first box, and the air outlet is communicated with the fan;

the cyclone portion is provided in the accommodating cavity, the cyclone portion comprises a plurality of cyclone cones and a cyclone cover, the plurality of the cyclone cones are around a circumference of the outer housing, ends with larger cross-sections of the plurality of the cyclone cones are all disposed upward, and the cyclone cover is located at an upper end of the plurality of the cyclone cones; and an upper wall surface of the cyclone cover and part of cavity walls of the accommodating cavity are enclosed to form an air outlet cavity, the cyclone cover is provided with a plurality of air ports, each of the air ports is communicated with the air outlet cavity and one of the cyclone cones, the cyclone cover is also provided with an air outlet pipe communicated with the air outlet cavity, the air outlet pipe is extended downward and is located between the plurality of the cyclone cones, and a lower end of the air outlet pipe is communicated with the air outlet.

7. The base station of claim 6, wherein the cyclone portion further comprises a plurality of pre-rotation structures, each of the pre-rotation structures is corresponding to one of the cyclone cones and comprises an outer ring, an inner ring and a guide vane, an end of the outer ring with an opening is provided on an upper end of the cyclone cone, the inner ring is provided in the outer ring, and is enclosed with the outer ring to form an air gap communicating with the cyclone cone, and the inner ring is also communicated with the air port; the guide vane is provided in the air gap and is connected to the inner ring and the outer ring to form an integrated structure, and the guide vane is provided in a spiral extending along a circumferential direction of the pre-rotation structure;

a second filter is provided in the air outlet cavity, and the second filter is annular and surrounds an outer side of the air outlet pipe and is located at an inner side of the plurality of air ports; and the cyclone separator further comprises an inner housing, the inner housing is an annular structure with openings at both ends, and the inner housing surrounds an outside of the plurality of cyclone cones; the inner housing divides a space of the accommodating cavity on a side of the cyclone cover facing the cyclone cone to form an inner cavity and an outer cavity surrounding the inner cavity, and a side peripheral surface of the inner housing is defined with filter holes that communicate with the outer cavity and the inner cavity.

8. A cleaning equipment, comprising:
a cleaning device; and
a base station of claim 1.

* * * * *